US012573215B2

(12) United States Patent
Ranipa et al.

(10) Patent No.: US 12,573,215 B2
(45) Date of Patent: Mar. 10, 2026

(54) LEARNING APPARATUS, LEARNING METHOD, OBJECT DETECTION APPARATUS, OBJECT DETECTION METHOD, LEARNING SUPPORT SYSTEM AND LEARNING SUPPORT METHOD

(71) Applicant: KABUSHIKI KAISHA TOSHIBA, Tokyo (JP)

(72) Inventors: Keyur Ranipa, Bangalore (IN);
Jitender Maurya, Bangalore (IN);
Osamu Yamaguchi, Yokohama (JP);
Daisuke Kobayashi, Tachikawa (JP);
Tomoyuki Shibata, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 683 days.

(21) Appl. No.: 17/899,122

(22) Filed: Aug. 30, 2022

(65) Prior Publication Data

US 2023/0132770 A1     May 4, 2023

(30) Foreign Application Priority Data

Nov. 4, 2021     (JP) ................................. 2021-180689

(51) Int. Cl.
G06V 20/60          (2022.01)
G06V 10/70          (2022.01)
(Continued)

(52) U.S. Cl.
CPC .............. G06V 20/60 (2022.01); G06V 10/70 (2022.01); G06V 20/70 (2022.01)

(58) Field of Classification Search
CPC ........ G06V 20/60; G06V 10/70; G06V 20/70; G06V 10/82
See application file for complete search history.

(56) References Cited

U.S. PATENT DOCUMENTS 10,706,336 B2 * 7/2020 Sohn ........................ G06F 18/21
10,929,721 B2 * 2/2021 Dupont De Dinechin ..................
G06V 10/7753
(Continued)

FOREIGN PATENT DOCUMENTS

JP          2018-200685 A     12/2018
JP          2021-18459 A       2/2021

OTHER PUBLICATIONS

K. Saito, Y. Ushiku, T. Harada and K. Saenko, "Strong-Weak Distribution Alignment for Adaptive Object Detection," 2019 IEEE/CVF Conference on Computer Vision and Pattern Recognition (CVPR), Long Beach, CA, USA, 2019, pp. 6949-6958, doi: 10.1109/CVPR.2019.00712. (Year: 2019).*

(Continued)

*Primary Examiner* — Gregory A Morse
*Assistant Examiner* — Ronde Lee Miller
(74) *Attorney, Agent, or Firm* — Oblon, McClelland, Maier & Neustadt, L.L.P.

(57)          ABSTRACT

According to one embodiment, a learning apparatus includes processing circuitry that generates a detection network for detecting an object from an image belonging to a target domain. The processing circuitry computes a detection task loss by supervised learning of the detection network. The processing circuitry computes a domain identification loss by adversarial learning of the detection network. The processing circuitry computes a self-learning loss by self-learning of the detection network. The processing circuitry computes a total loss based on weighted addition of the domain identification loss, the detection task loss and/or the self-learning loss. The processing circuitry updates learning parameters of the detection network by minimizing the total loss.

16 Claims, 18 Drawing Sheets

(51) Int. Cl.
　　*G06V 10/82* 　　　(2022.01)
　　*G06V 20/70* 　　　(2022.01)

(56) References Cited

U.S. PATENT DOCUMENTS

2021/0312232 A1 　10/2021　Tensmeyer et al.
2023/0132770 A1* 　5/2023　Ranipa ................... G06V 10/82
　　　　　　　　　　　　　　　　　　　382/103

OTHER PUBLICATIONS

S. Kim, J. Choi, T. Kim and C. Kim, "Self-Training and Adversarial Background Regularization for Unsupervised Domain Adaptive One-Stage Object Detection," 2019 IEEE/CVF International Conference on Computer Vision (ICCV), Seoul, Korea (South), 2019, pp. 6091-6100, doi: 10.1109/ICCV.2019.00619. (Year: 2019).*
I. Radosavovic, P. Dollár, R. Girshick, G. Gkioxari and K. He, "Data Distillation: Towards Omni-Supervised Learning," 2018 IEEE/CVF Conference on Computer Vision and Pattern Recognition, Salt Lake City, UT, USA, 2018, pp. 4119-4128, doi: 10.1109/CVPR.2018.00433. (Year: 2018).*
N. Inoue, R. Furuta, T. Yamasaki and K. Aizawa, "Cross-Domain Weakly-Supervised Object Detection Through Progressive Domain Adaptation," 2018 IEEE/CVF Conference on Computer Vision and Pattern Recognition, Salt Lake City, UT, USA, 2018, pp. 5001-5009, doi: 10.1109/CVPR.2018.00525. (Year: 2018).*
Breton Minnehan, Andreas Savakis; "Manifold Guided Label Transfer for Deep Domain Adaptation", Proceedings of the IEEE Conference on Computer Vision and Pattern Recognition (CVPR) Workshops, 2017, pp. 65-73 (Year: 2017).*
Saito et al., "Strong-Weak Distribution Alignment for Adaptive Object Detection", CVPR 2019, 14 pages, https://arxiv.org/pdf/1812.04798.pdf.
Kim et al., "Self-Training and Adversarial Background Regularization for Unsupervised Domain Adaptive One-Stage Object Detection", ICCV 2019, 10 pages, https://arxiv.org/pdf/1909.00597.
Verma et al., "Manifold Mixup: Better Representations by Interpolating Hidden States", ICML 2019, 21 pages, https://arxiv.org/pdf/1806.05236.pdf.
Simonyan et al., "Very Deep Convolutional Networks for Large-Scale Image Recognition", ICLR 2015, arXiv preprint arXiv:1409.15568, 14 pages.
He et al., "Deep Residual Learning for Image Recognition", Proceedings of the IEEE conference on computer vision and pattern recognition, 2016, 9 pages.
Liu et al., "SSD: Single Shot MultiBox Detector", European conference on computer vision, Springer, Cham, 2016, 17 pages.
Zhou et al., "Objects as Points", arXiv1904.07850, 2019, 12 pages.
Ren et al., "Faster R-CNN: Towards Real-Time Object Detection with Region Proposal Networks", Advances in neural information processing systems, 2015, 9 pages.
Lin et al., "Focal Loss for Dense Object Detection", ICCV 2017, 9 pages.
Zhang et al., "mixup: Beyond Empirical Risk Minimization", ICLR 2018, arXiv:1710.09412, 13 pages.
Jeong et al.,"Interpolation-based semi-supervised learning for object detection", CoRR, abs/2006.02158, 2020, 10 pages.
Berthelot et al., "MixMatch: A holistic approach to semi-supervised learning", Advances in Neural Information Systems, vol. 32, Curran Associates, Inc., 2019, 14 pages.
Japanese Office Action issued Mar. 18, 2025 in Japanese Patent Application No. 2021-180689 (with unedited computer-generated English translation), citing references 1, 15, and 24 therein, 10 pages.
Chen et al., "Domain Adaptive Faster R-CNN for Object Detection in the Wild", arXiv, Mar. 8, 2018, 10 pages.

* cited by examiner

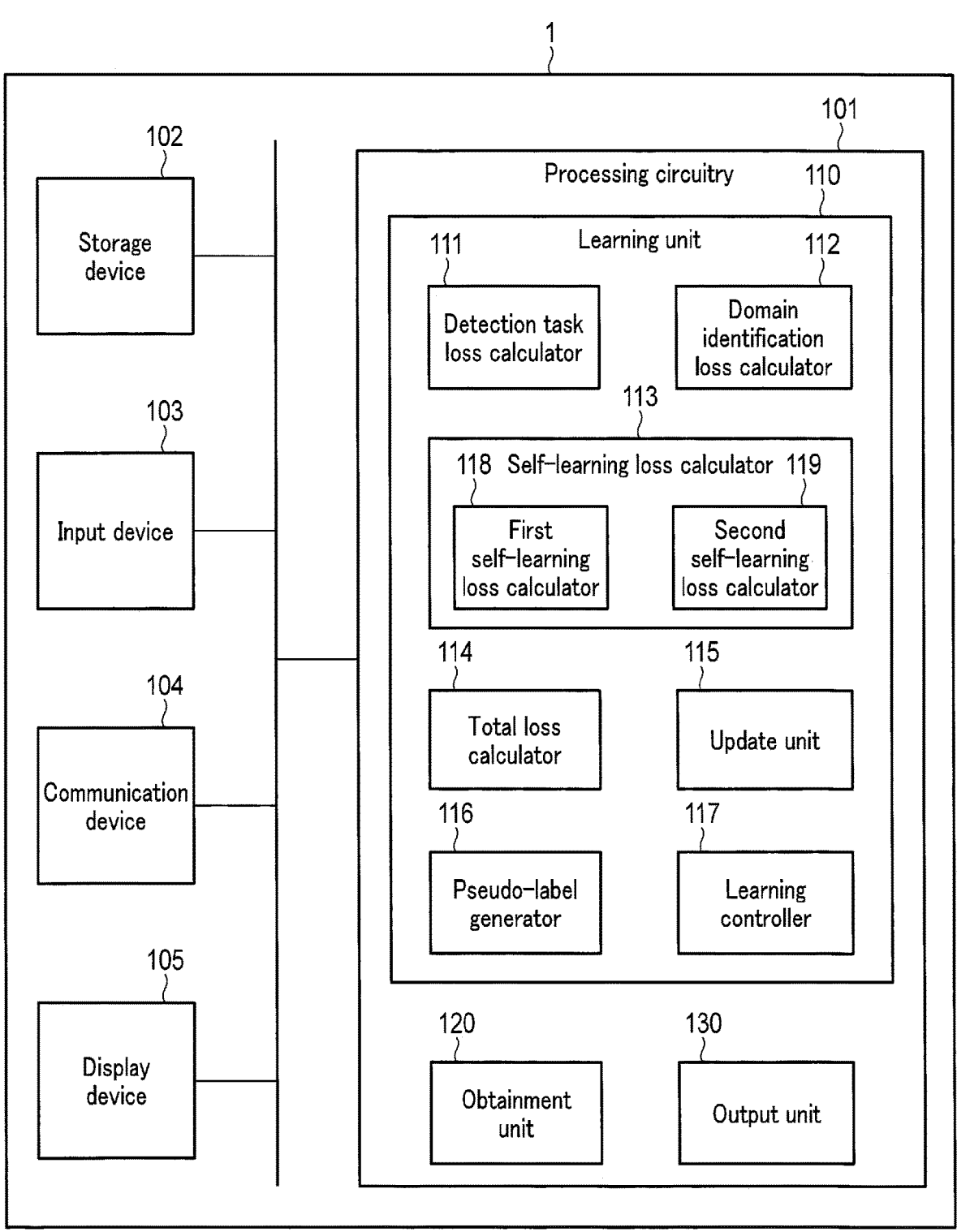
F I G. 1

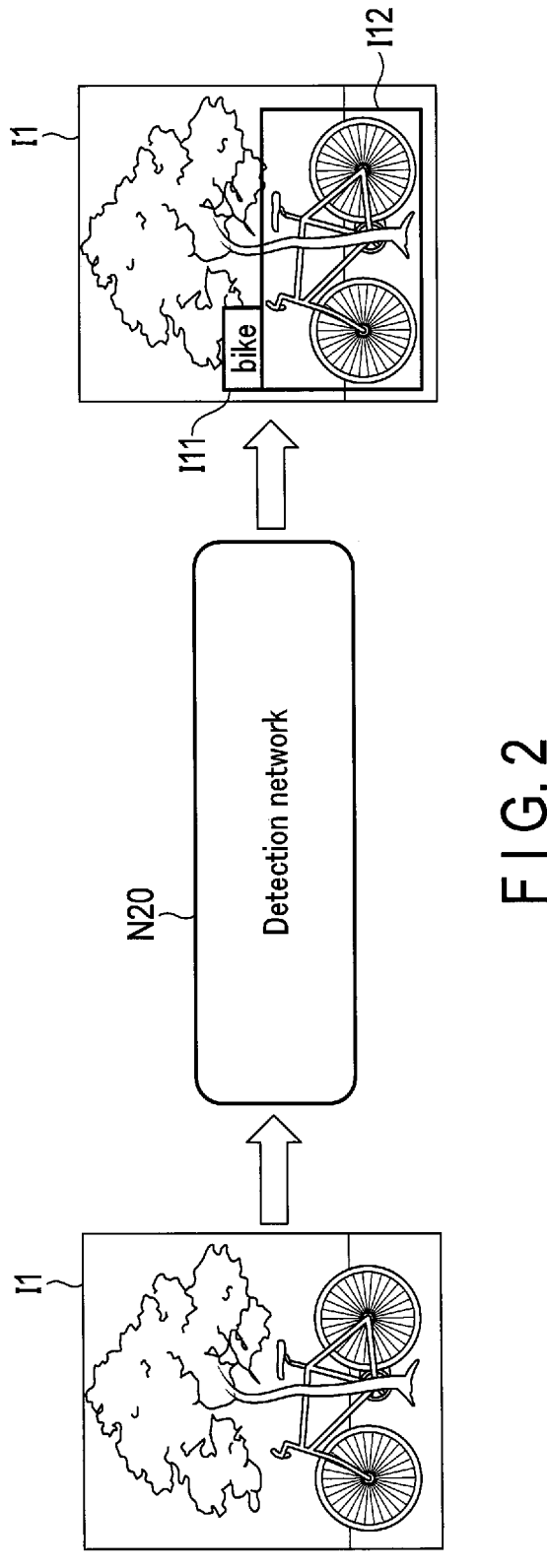
F I G. 2

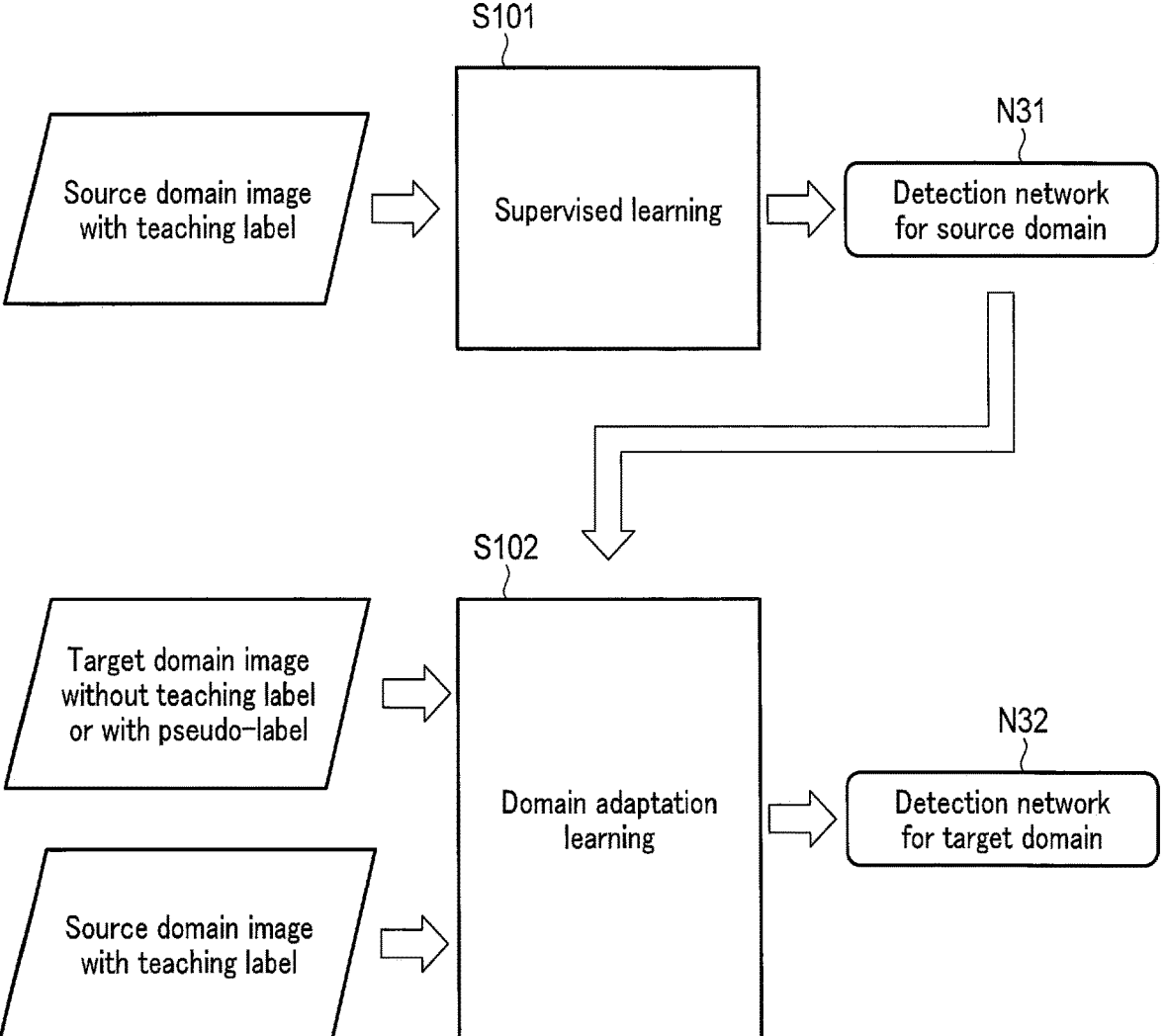
F I G. 3

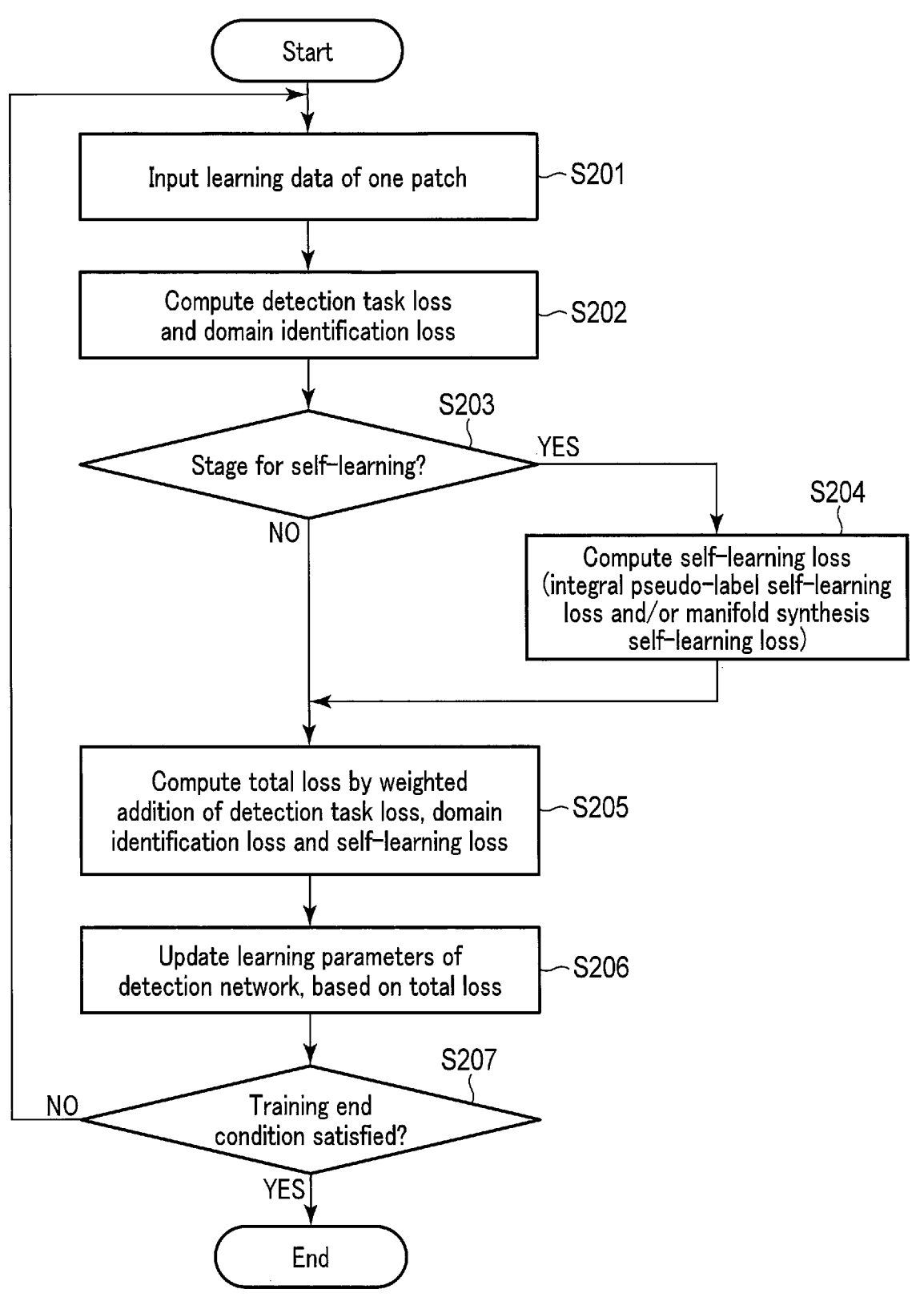
F I G. 4

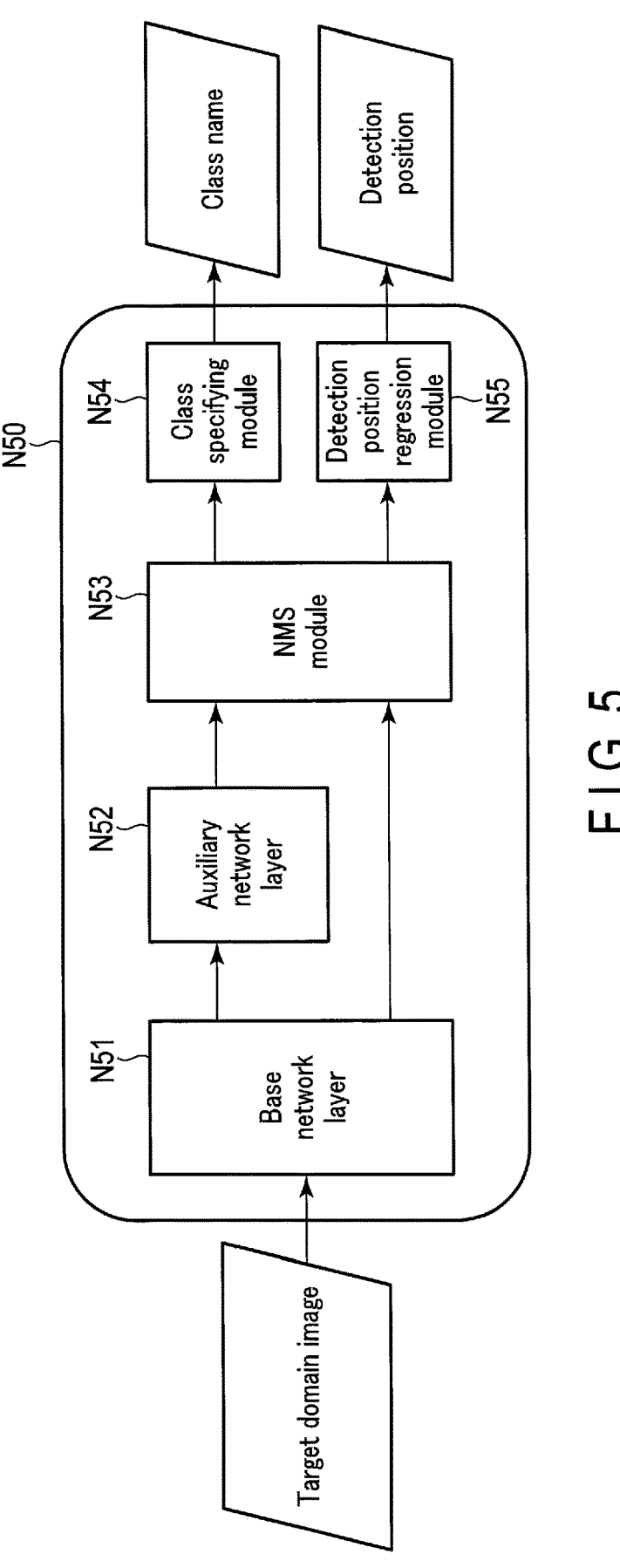
F I G. 5

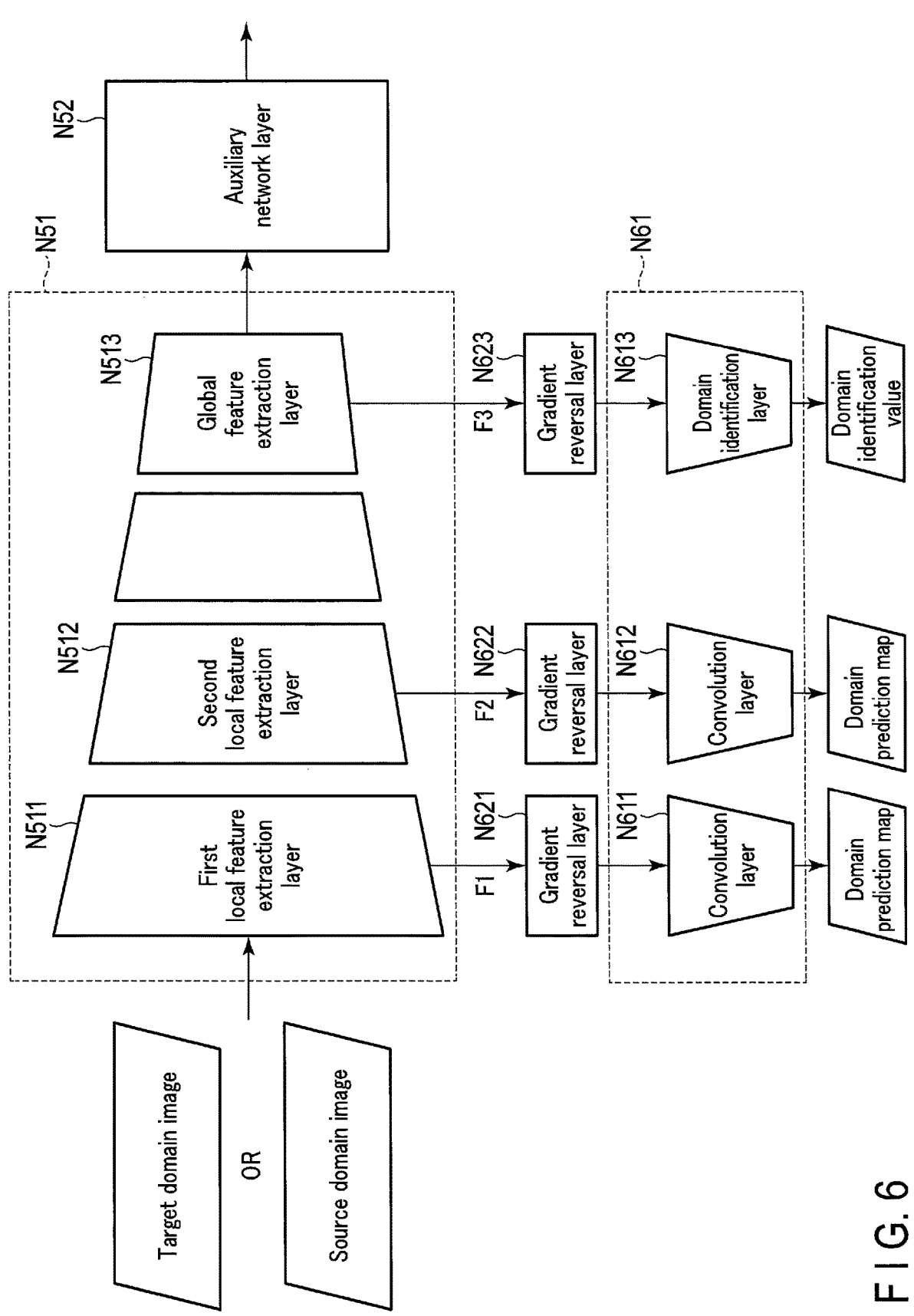
F I G. 6

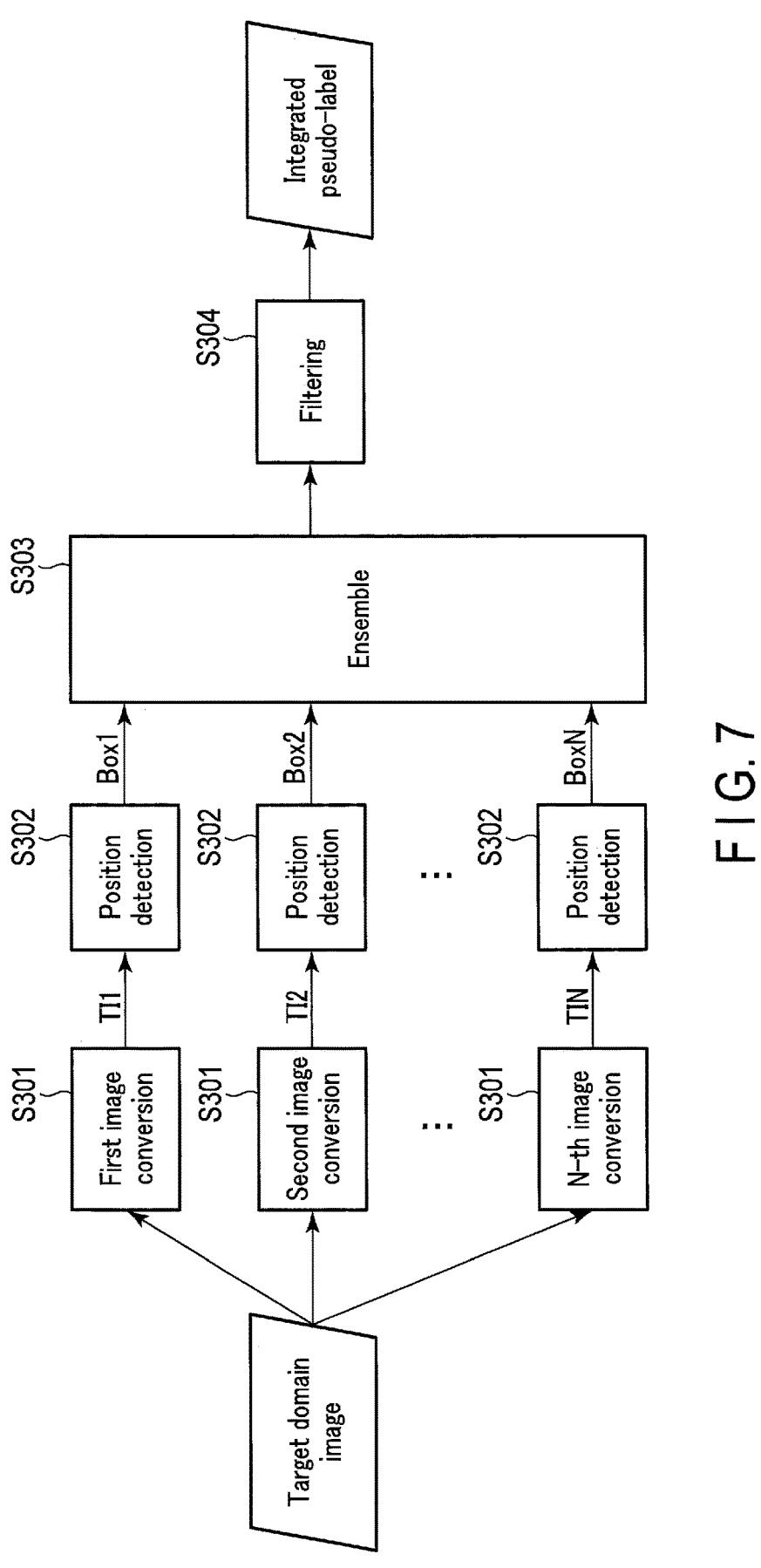
F I G. 7

Input O, O*, $\varepsilon$, $\delta$
Output Y = {y}
1:   for $r_j$* $\in$ O* do
2:        for $r_i$ $\in$ O do
3:             if IoU $(r_i, r_j$*$) \geq \delta$ then
4:                  collect $r_i$ from O
5:             end if
6:        end for
7:        compute SRRS according to equation (6)
8:        if SRRS $\geq \varepsilon$ then
9:             add $r_j$* to set Y of pseudo-labels
10:       end if
11: end for
F I G. 8
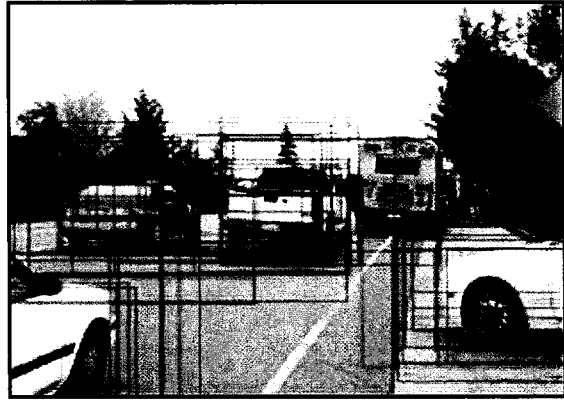
Prediction result of one image
F I G. 9

Superimposition of prediction results
F I G. 10
Integrated pseudo-label
F I G. 11

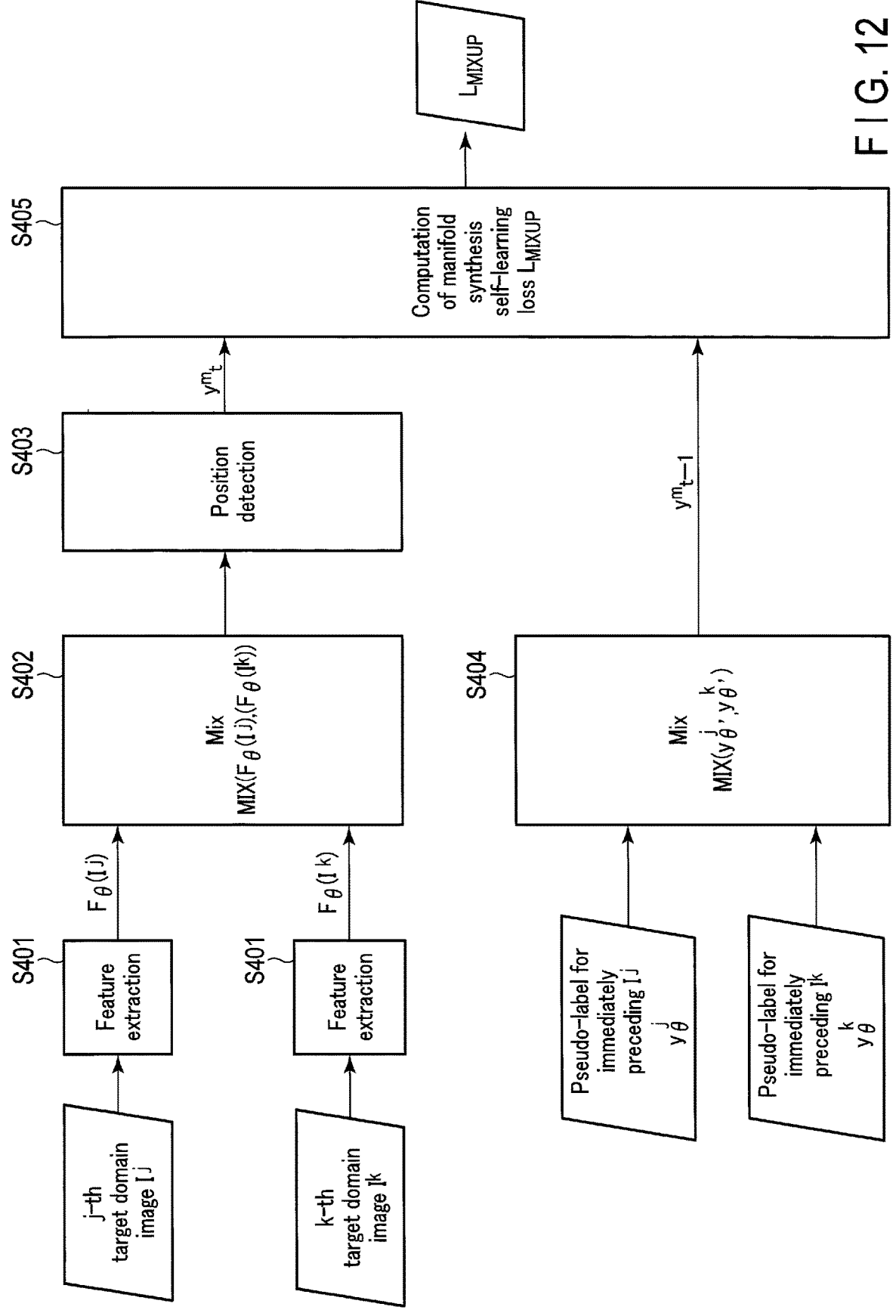
F I G. 12

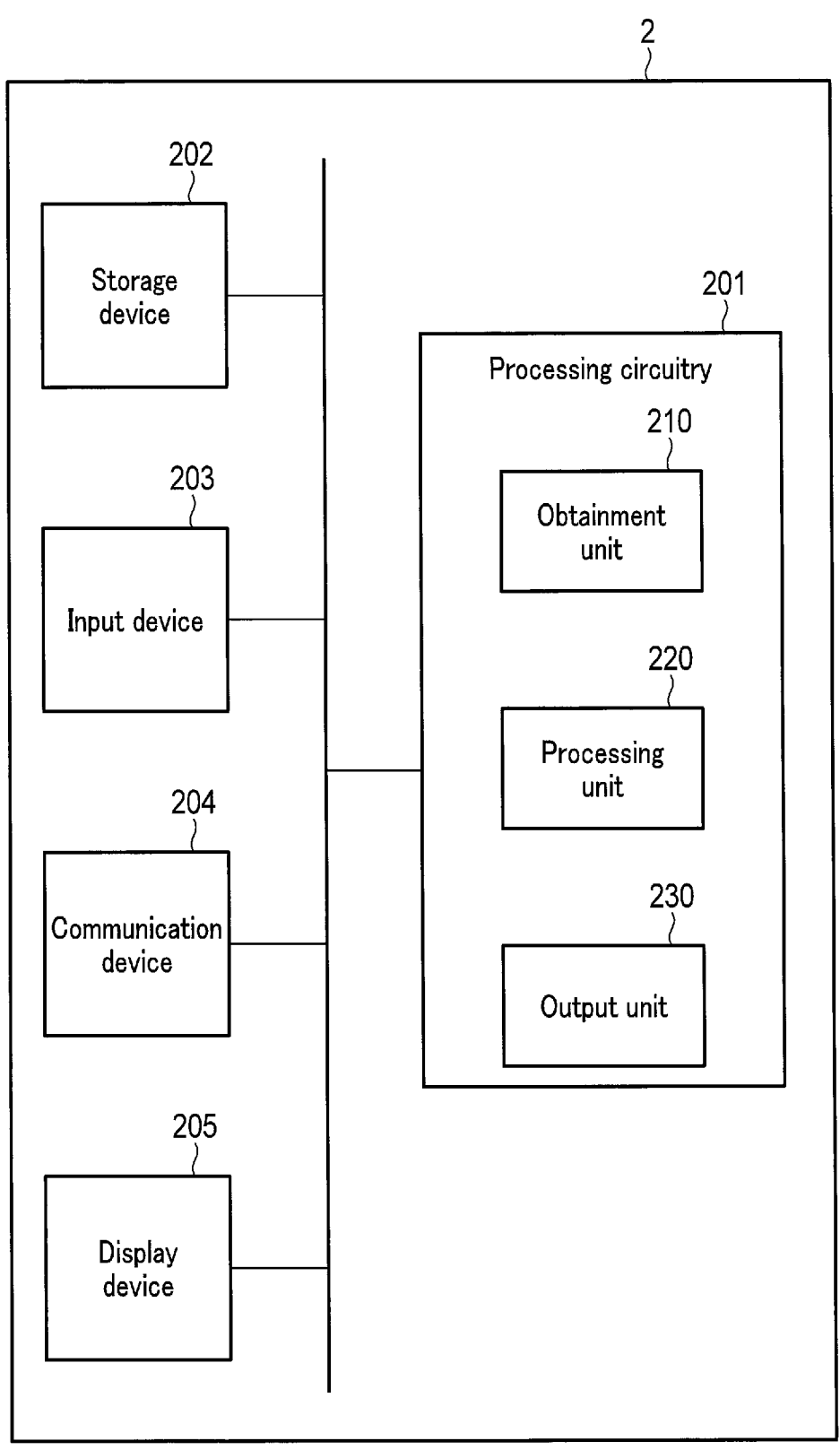
F I G. 13

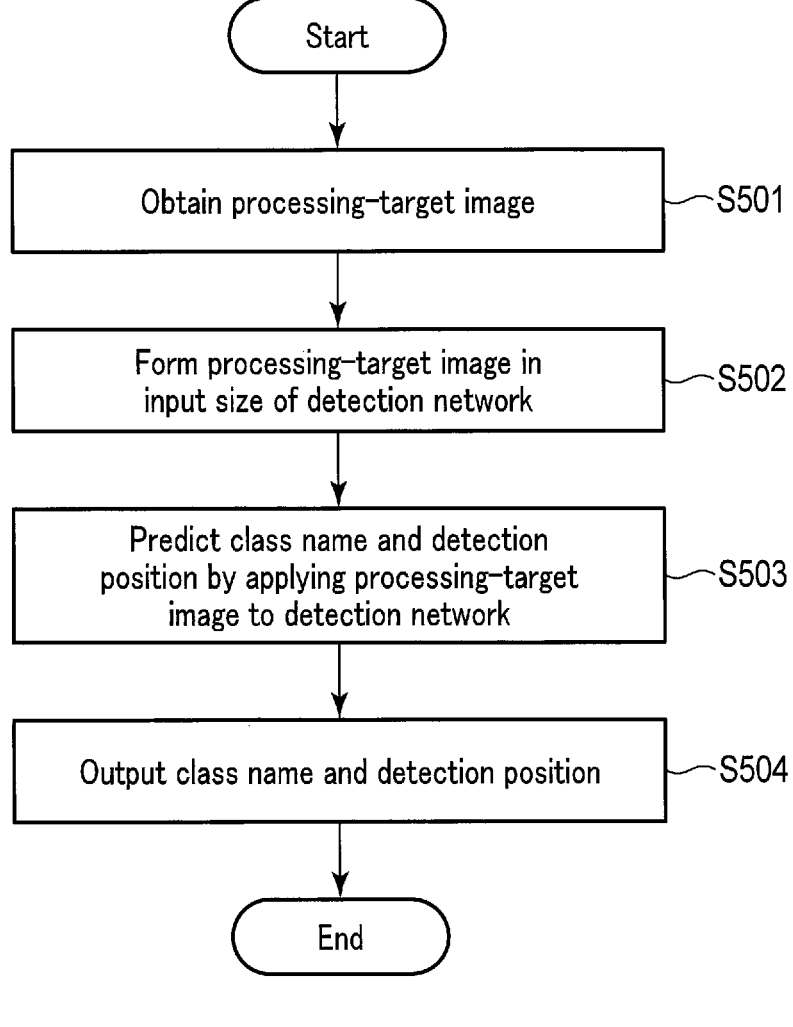
F I G. 14

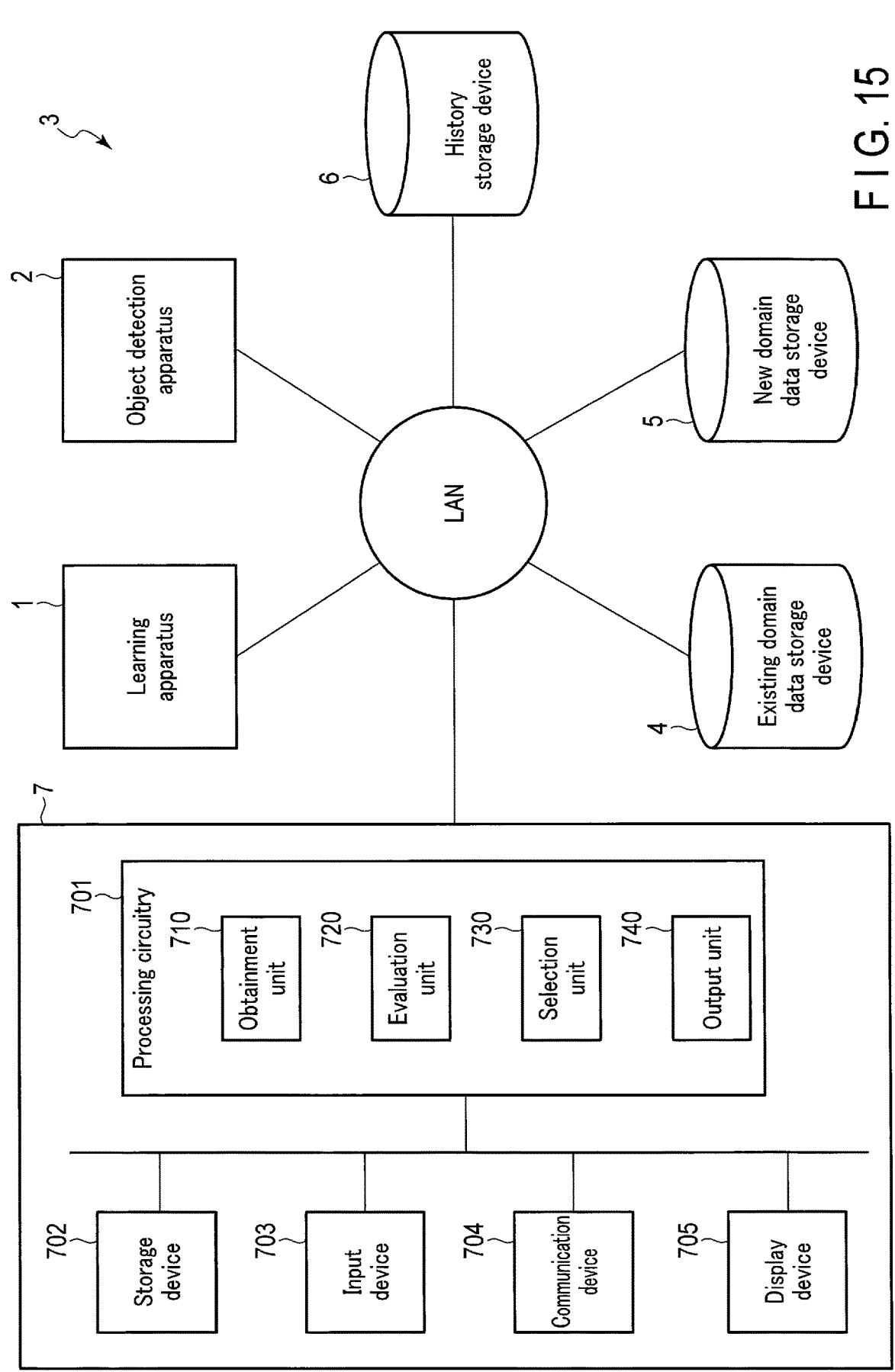
F I G. 15

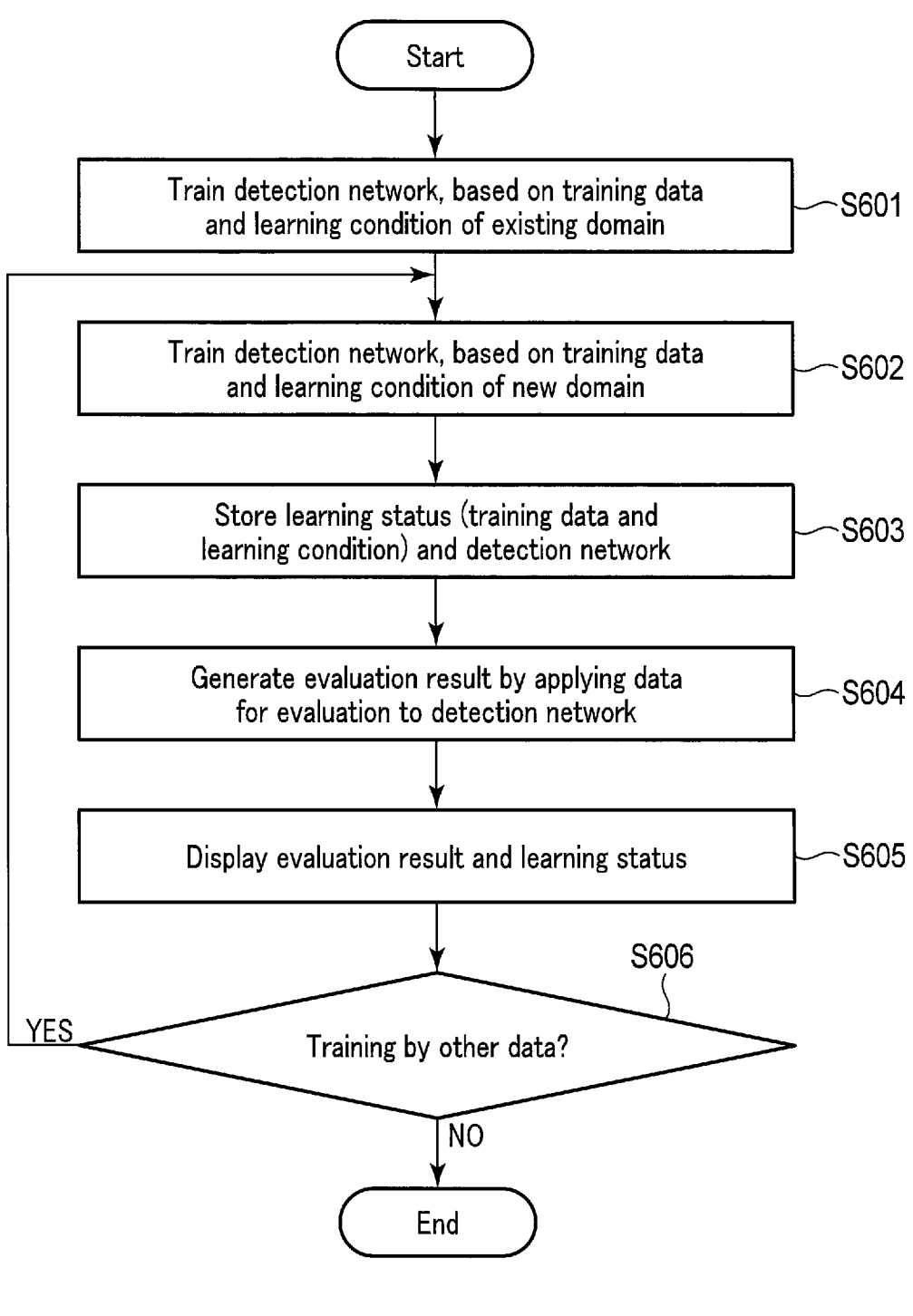
F I G. 16

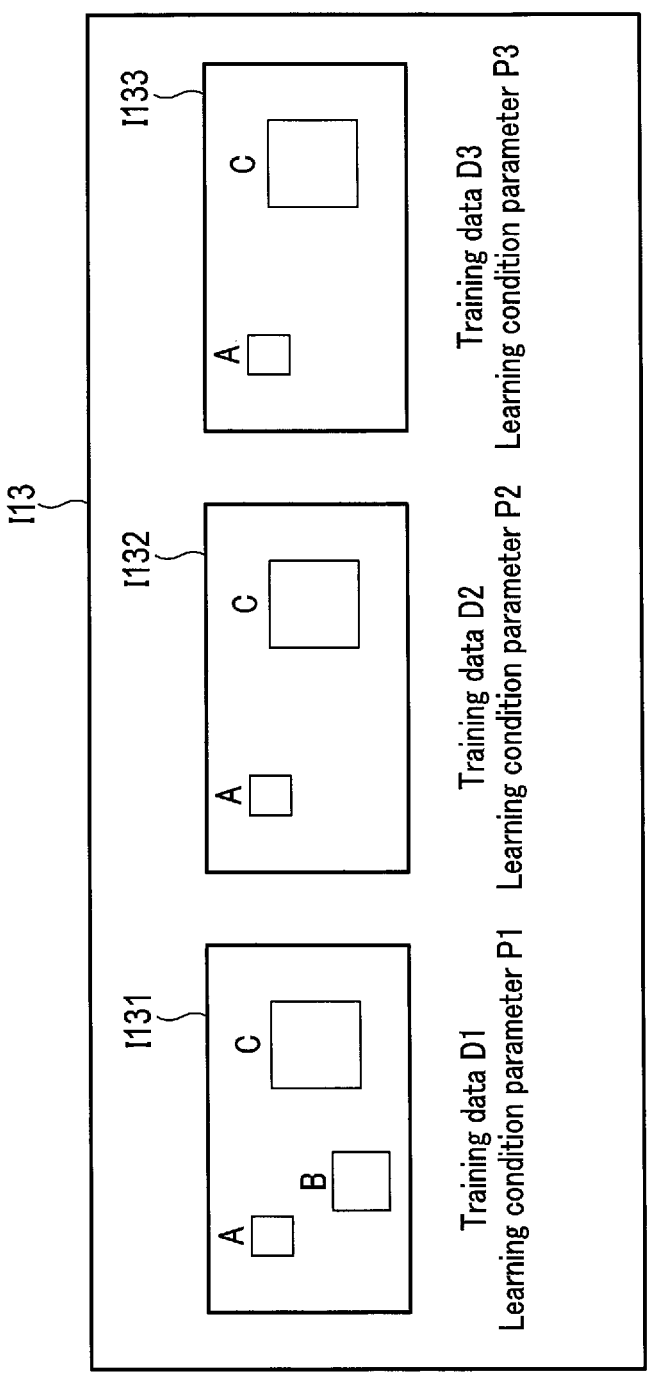
F I G. 17

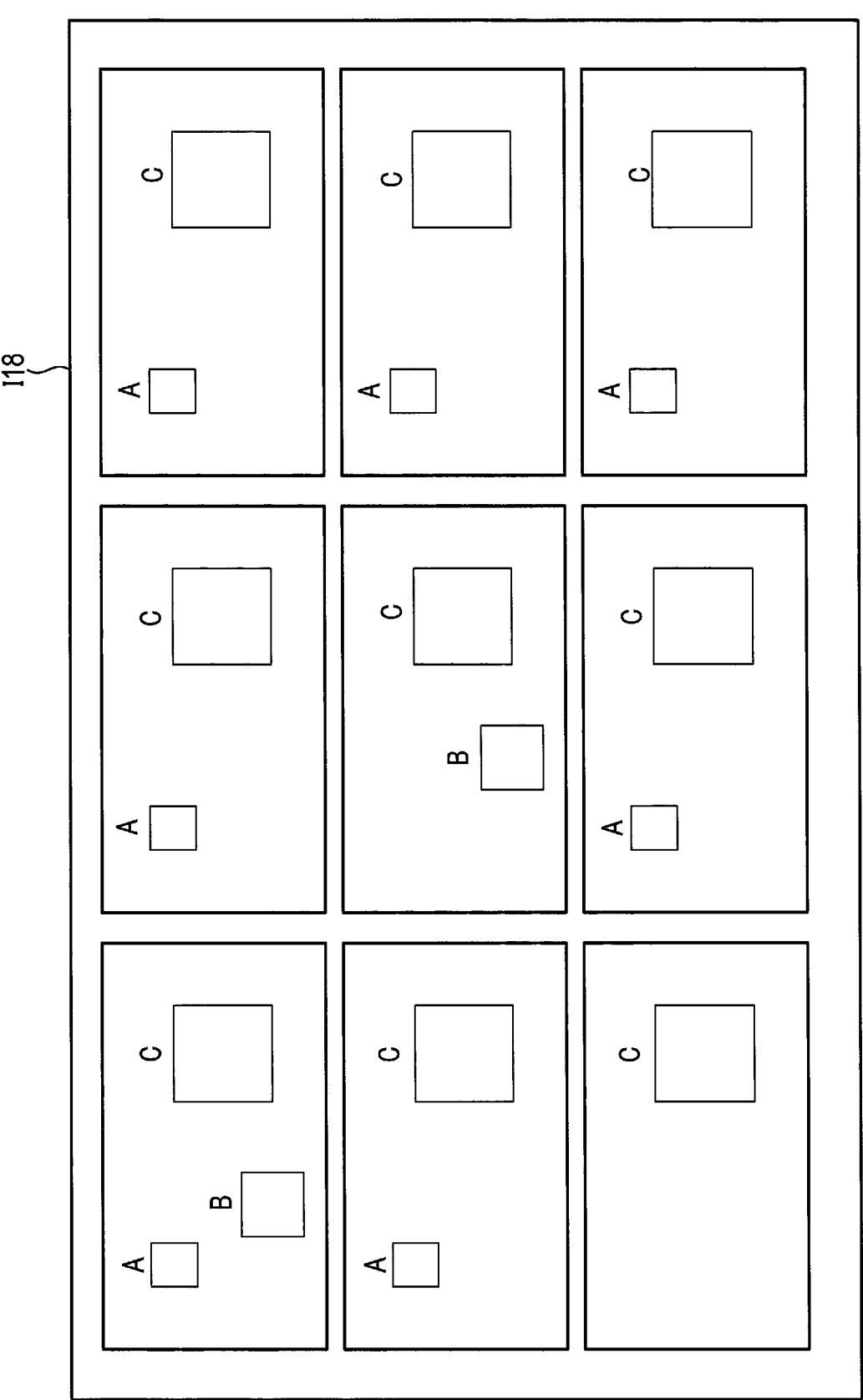
F I G . 18

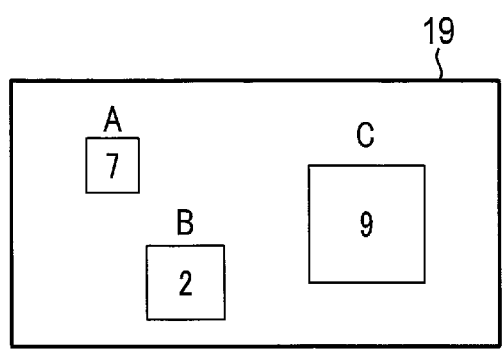
F I G. 19
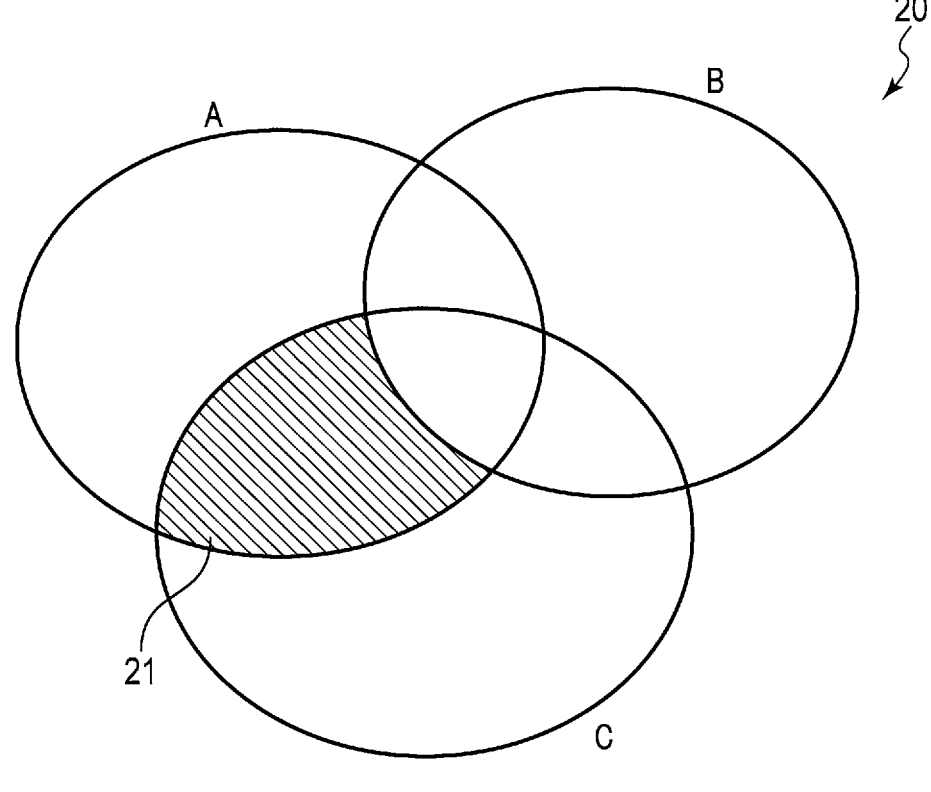
F I G. 20

|  |  | Global·Local 1 | BSR | WST 2 | Man.Mixup 3 |  | mAP |
|---|---|---|---|---|---|---|---|
| (A) | SSD300 |  |  |  |  |  | 0.214 |
| (B) | Supervised(Clipart) |  |  |  |  |  | 0.455 |
| (C1) | Comparative methods |  | ○ |  |  |  | 0.277 |
| (C2) |  | ○ |  |  |  |  | 0.308 |
| (C3) |  | ○ |  | ○ |  |  | 0.346 |
| (P1) | Methods of present application | ● |  |  |  |  | 0.320 |
| (P2) |  | ○ |  | ● |  |  | 0.344 |
| (P3) |  | ● |  | ● |  |  | 0.377 |
| (P4) |  | ● |  | ● | ● |  | 0.413 |

F I G. 21

LEARNING APPARATUS, LEARNING METHOD, OBJECT DETECTION APPARATUS, OBJECT DETECTION METHOD, LEARNING SUPPORT SYSTEM AND LEARNING SUPPORT METHOD

CROSS-REFERENCE TO RELATED APPLICATIONS

This application is based upon and claims the benefit of priority from prior Japanese Patent Application No. 2021-180689, filed Nov. 4, 2021, the entire contents of which are incorporated herein by reference.

FIELD

Embodiments described herein relate generally to a learning apparatus, a learning method, an object detection apparatus, an object detection method, a learning support system and a learning support method.

BACKGROUND

In recent years, many object detection methods using a CNN (Convolutional Neural Network) have been proposed. Among these, domain adaptation is proposed which efficiently performs learning by utilizing data belonging to a new domain (target domain) for a detection network trained based on data belonging to an existing domain (source domain). In particular, in domain adaptation utilizing weak supervised learning, a detection network is trained based on data belonging to a new domain to which a teaching label (annotation) such as an object detection position is not given.

BRIEF DESCRIPTION OF THE DRAWINGS

FIG. 1 is a diagram illustrating a configuration example of a learning apparatus according to a first embodiment.

FIG. 2 is a view illustrating an example of an input and an output of a detection network.

FIG. 3 is a view illustrating a training process of a detection network by domain adaptation.

FIG. 4 is a flowchart of domain adaptation learning by a learning apparatus.

FIG. 5 is a diagram illustrating a network configuration example of a detection network used in domain adaptation learning.

FIG. 6 is a diagram illustrating a network configuration example of a detection network for a domain identification loss.

FIG. 7 is a diagram illustrating a generation process of an integrated pseudo-label.

FIG. 8 is a view illustrating a pseudo-code of an algorithm of filtering in step S304.

FIG. 9 is a view illustrating a prediction result of a detection position for one image.

FIG. 10 is a view illustrating superimposition of prediction results of a plurality of detection positions for a plurality of images.

FIG. 11 is a view illustrating an integrated pseudo-label.

FIG. 12 is a diagram illustrating a computation process of a manifold synthesis self-learning loss.

FIG. 13 is a diagram illustrating a configuration example of an object detection apparatus according to a second embodiment.

FIG. 14 is a flowchart of object detection by the object detection apparatus.

FIG. 15 is a diagram illustrating a configuration example of a learning support system according to a third embodiment.

FIG. 16 is a flowchart of learning support by the learning support system.

FIG. 17 is a diagram illustrating an example of a display screen of an evaluation result and a learning status.

FIG. 18 is a view illustrating an example of a display screen of nine evaluation results.

FIG. 19 is a view illustrating an aggregate result of the nine evaluation results illustrated in FIG. 18.

FIG. 20 is a Venn diagram representing the aggregate result of FIG. 19.

FIG. 21 is a view illustrating a comparison result of performance of domain adaptation learning.

DETAILED DESCRIPTION

A learning apparatus according to one embodiment includes processing circuitry configured to generate a detection network for detecting an object from an image belonging to a target domain, the processing circuitry being configured to: compute a detection task loss that is a loss relating to a detection position and class identification, by supervised learning of the detection network, the supervised learning being based on the image belonging to the target domain; compute a domain identification loss by adversarial learning of the detection network, the adversarial learning being based on the image belonging to the target domain and an image belonging to a source domain, and the domain identification loss being a loss relating to identification of the target domain and the source domain; compute a self-learning loss by self-learning of the detection network, the self-learning being based on the image belonging to the target domain, and the self-learning loss being a loss relating to class identification by the self-learning; compute a total loss, based on weighted addition of the domain identification loss, the detection task loss and/or the self-learning loss; and update learning parameters of the detection network by minimizing the total loss.

In patent literature 1 (Jpn. Pat. Appln. KOKAI Publication No. 2018-200685), an object detector is trained by only a category label of an image level, without position information. No mention is made of domain adaptation in a case where a class is unknown, or in a case where a domain gap is large. Non-patent literature 1 (Kuniaki Saito, et al. "Strong-Weak Distribution Alignment for Adaptive Object Detection", arXiv:1812.04798v3 [cs.CV]5 Apr. 2019) proposes a function of making closer the feature expressions of a source domain and a target domain by using adversarial training. In non-patent literature 2 (Seunghyeon Kim, et al. "Self-Training and Adversarial Background Regularization for Unsupervised Domain Adaptive One-Stage Object Detection", arXiv:1909.00597v1 [cs.CV] 2 Sep. 2019), learning using data of a target domain is performed by introducing weak supervised self-training and adversarial background score regularization. Non-patent literature 3 (Vikas Verma, et al. "Manifold Mixup: Better Representations by Interpolating Hidden States", arXiv:1806.05236v7 [stat.ML] 11 May 2019) proposes a method in which, with respect to data augmentation aiming at augmenting training data, a boundary surface is well trained by Manifold Mixup utilizing linear connection of outputs of intermediate layers of a network, in regard to Mixup that increases the number of data of images by executing linear connection of images.

Further, for the task of object detection, Non-patent literature 4 (Jisoo Jeong, Vikas Verma, Minsung Hyun, Juho Kannala, and Nojun Kwak. "Interpolation-based semi-supervised learning for object detection", CoRR, abs/2006.02158, 2020) shows the effectiveness of interpolation-based regularization in semi-supervised learning settings, where primary objective is to improve performance of the detector on unlabeled samples of the source domain dataset.

In semi-supervised learning for image classification tasks, Non-patent literature 5 (David Berthelot, Nicholas Carlini, Ian Goodfellow, Nicolas Papernot, Avital Oliver, and Colin A Raffel. "Mixmatch: A holistic approach to semi-supervised learning", In Advances in Neural Information Processing Systems, volume 32. Curran Associates, Inc., 2019) uses low-entropy prediction for interpolating unlabeled samples and exploits ensembles of multiple transformation results.

As regards non-patent literatures 1 to 3, each of functions is introduced in two-stage type object detection or other tasks. However, there is no example of introduction to one-stage type object detectors, and verification of a combination thereof. In addition, although non-patent literature 2 adopts supervised self-learning and aims at reducing an adverse effect by an inaccurate pseudo-label, there is room for an improvement in the generation method of the pseudo-label.

Moreover, non-patent literature 4 does not address improving the performance of the object detector for target domain data sets that do not have labeled samples. And, non-patent literature 5 does not apply to detection tasks and does not discuss addressing domain differences.

The problem to be solved by the present embodiments is to provide a learning apparatus, a learning method, a learning program, an object detection apparatus, an object detection method, an object detection program, a learning support system, a learning support method and a learning support program, which can improve the performance of object detection by a detection network obtained by domain adaptation.

Hereinafter, with reference to the accompanying drawings, a description is given of a learning apparatus, a learning method, a learning program, an object detection apparatus, an object detection method, an object detection program, a learning support system, a learning support method and a learning support program according to the embodiments.

First Embodiment

A first embodiment relates to a learning apparatus, a learning method and a learning program.

FIG. 1 is a diagram illustrating a configuration example of a learning apparatus 1 according to the first embodiment. The learning apparatus 1 according to the first embodiment is a computer that trains a deep learning network for executing object detection. It is assumed that the deep learning network for executing object detection is called "detection network".

FIG. 2 is a view illustrating an example of an input and an output of a detection network N20. The detection network N20 is a deep learning network in which learning parameters are trained such that an image I1 is input and a class name I11 and a detection position I12 of a specific object included in the image I1 are output. The learning parameters mean parameters optimized in a training process, among the parameters allocated to the detection network N20. The learning parameters include, for example, a weight parameter and a bias. FIG. 2 illustrates an example in which a bicycle is set as a specific object. In this case, text information of "bike" that means a bicycle is output as the class name I11, and a rectangle (bounding box) surrounding the bicycle is output as the detection position I12. Note that the specific object is not limited to one kind, and a plurality of kinds of specific objects may be set.

The detection network is used to detect specific objects from images captured by any photography device. The photography device and the specific object are not particularly limited. For example, the detection network is assumed to be used in person detection in regard to images captured by a security camera, or in vehicle detection in regard to video captured by an in-vehicle camera.

As illustrated in FIG. 1, the learning apparatus 1 is a computer including processing circuitry 101, a storage device 102, an input device 103, a communication device 104 and a display device 105. Data communication between the processing circuitry 101, storage device 102, input device 103, communication device 104 and display device 105 is executed via a bus.

The processing circuitry 101 includes a processor such as a CPU (Central Processing Unit), and a memory such as a RAM (Random Access Memory). The processing circuitry 101 includes a learning unit 110, an obtainment unit 120 and an output unit 130. The processing circuitry 101 implements the functions of the respective units 110 to 130 by executing a learning program relating to machine learning according to the present embodiment. The learning program is stored in a non-transitory computer-readable storage medium such as the storage device 102. The learning program may be implemented as a single program that describes all functions of the units 110 to 130, or may be implemented as a plurality of modules divided into some functional units. Besides, the units 110 to 130 may be implemented by integrated circuits such as an Application Specific Integrated Circuit (ASIC). In this case, the units 110 to 130 may be implemented in a single integrated circuit, or may be individually implemented in a plurality of integrated circuits.

The learning unit 110 generates a detection network for detecting an object from an image belonging to a target domain. Specifically, by domain adaptation based on an image belonging to a target domain and an image belonging to a source domain, the learning unit 110 generates a detection network adaptive to the target domain, from a detection network trained in the source domain. The target domain means a domain in which a teaching label is absent in each of all images belonging to this domain, or, even if teaching labels are present, the number of teaching labels is small. The teaching label means a label used as teaching data in supervised learning or the like, and means a class name and a detection position in the detection task according to the present embodiment. The source domain means a domain in which teaching labels are present for substantially all images belonging to this domain. An image belonging to the target domain is referred to as "target domain image", and an image belonging to the source domain is referred to as "source domain image".

FIG. 3 is a view illustrating a training process of a detection network by domain adaptation. As illustrated in FIG. 3, to begin with, the learning unit 110 generates a detection network N31 for the source domain, by supervised learning based on a source domain image with a teaching label (S101). The detection network N31 is a detection network that is optimized for detecting a specific object from the source domain image. Next, the learning unit 110 generates a detection network N32 for the target domain, by domain adaptation learning based on a target domain image without a teaching label and a source domain image with a teaching label (S102). The detection network N32 for the target domain is a detection network that is optimized for detecting a specific object from the target domain image. The first embodiment mainly aims at generating the detection network N32 for the target domain. It is assumed that the "detection network" means the detection network for the target domain, unless otherwise indicated in particular. If a teaching label is absent for a target domain image, a pseudo-label may be attached to the target domain image.

As illustrated in FIG. 1, the learning unit 110 includes a detection task loss calculator 111, a domain identification loss calculator 112, a self-learning loss calculator 113, a total loss calculator 114, an update unit 115, a pseudo-label generator 116, and a learning controller 117.

The detection task loss calculator 111 computes a detection task loss by supervised learning of a detection network, the supervised learning being based on the target domain image. The detection task loss is a loss relating to a detection position and class identification. When a teaching label is present for the target domain image, the teaching label is used as teaching data. Specifically, supervised learning based on the teaching label and the target domain image is executed. When a teaching label is absent for the target domain image, a pseudo-label is used as teaching data. Specifically, supervised learning based on the pseudo-label and the target domain image is executed. Note that the pseudo-label means a label, the reliability of which is not guaranteed because of the obtainment by the computation by the pseudo-label generator 116, unlike the teaching label, the reliability of which is guaranteed since the teaching label is given manually.

The domain identification loss calculator 112 computes a domain identification loss by adversarial learning of the detection network, the adversarial learning being based on the target domain image and the source domain image. The domain identification loss is a loss relating to identification of the target domain and the source domain.

The self-learning loss calculator 113 computes a self-learning loss by self-learning of the detection network, the self-learning being based on the target domain image. The self-learning loss is a loss relating to class identification by self-learning.

As illustrated in FIG. 1, the self-learning loss calculator 113 includes a first self-learning loss calculator 118 and a second self-learning loss calculator 119. The first self-learning loss calculator 118 computes an integrated pseudo-label self-learning loss as the self-learning loss. The integrated pseudo-label self-learning loss is a loss relating to class identification by self-learning utilizing an integrated pseudo-label. The integrated pseudo-label is a kind of pseudo-label, which is generated by the pseudo-label generator 116. The second self-learning loss calculator 119 computes a manifold synthesis self-learning loss as the self-learning loss. The manifold synthesis self-learning loss is a loss relating to class identification by self-learning utilizing a manifold synthesis pseudo-label. The manifold synthesis pseudo-label is a kind of pseudo-label, which is generated by the pseudo-label generator 116.

The total loss calculator 114 computes a total loss, based on weighted addition of the domain identification loss, detection task loss and/or self-learning loss. Specifically, there are a case of computing the total loss, based on weighted addition of the domain identification loss and the detection task loss; a case of computing the total loss, based on weighted addition of the domain identification loss and the integrated pseudo-label self-learning loss; a case of computing the total loss, based on weighted addition of the domain identification loss and the manifold synthesis self-learning loss; a case of computing the total loss, based on weighted addition of the domain identification loss, the detection task loss and the integrated pseudo-label self-learning loss; a case of computing the total loss, based on weighted addition of the domain identification loss, the detection task loss and the manifold synthesis self-learning loss; a case of computing the total loss, based on weighted addition of the domain identification loss, the integrated pseudo-label self-learning loss and the manifold synthesis self-learning loss; and a case of computing the total loss, based on weighted addition of the domain identification loss, the detection task loss, the integrated pseudo-label self-learning loss and the manifold synthesis self-learning loss.

The update unit 115 updates the learning parameters of the detection network by minimizing the total loss. The update of the learning parameters is executed according to a predetermined optimization method.

The pseudo-label generator 116 generates, based on a target domain image, a pseudo-label relating to the target domain image. For example, the pseudo-label generator 116 outputs, as a pseudo-label, a class name and/or a detection position, by forwardly propagating a target domain image to a detection network in a current iteration stage. In addition, the pseudo-label generator 116 generates an integrated pseudo-label and a manifold synthesis pseudo-label. The integrated pseudo-label is a pseudo-label obtained by integrating a plurality of pseudo-labels that are based on a plurality of post-conversion images generated by applying a plurality of kinds of image conversions to a target domain image. The manifold synthesis pseudo-label is a pseud-label that is based on linear connection of intermediate features, which are output from a feature extraction layer of the detection network.

The learning controller 117 comprehensively controls the domain adaptation learning according to the first embodiment. In the domain adaptation learning, the update of learning parameters, which is based on the total loss, is repeatedly executed. In every predetermined iteration stage (hereinafter referred to as "stage"), the learning controller 117 determines whether the current stage is a stage for executing self-learning. If the learning controller 117 determines that the current stage is the stage for executing self-learning, the learning controller 117 outputs to the self-learning loss calculator 113 an instruction to compute the self-learning loss. If the learning controller 117 determines that the current iteration stage is not the stage for executing self-learning, the learning controller 117 outputs to the self-learning loss calculator 113 an instruction not to compute the self-learning loss. In each stage, the learning controller 117 determines whether or not to meet a learning stop condition, and repeats the update of learning parameters by the update unit 115, until the learning stop condition is satisfied.

The obtainment unit 120 obtains various kinds of data. For example, the obtainment unit 120 obtains learning data of the detection network, that is, a data set of target domain images and a data set of source domain images. The obtainment unit 120 may obtain the various data from an external apparatus via the communication device 104, or may obtain the various data from the storage device 102.

The output unit 130 outputs various data. For example, the output unit 130 outputs to the storage device 102 the detection network trained by the learning unit 110, or outputs the trained detection network to an external apparatus via the communication device 104. In addition, the output unit 130 causes the display device 105 to display the target domain image, class name, detection position, and the like.

The storage device 102 is composed of a ROM (Read Only Memory), an HDD (Hard Disk Drive), an SSD (Solid State Drive), an integrated circuit storage device, or the like. The storage device 102 stores various data such as learning data, a learning program, and the like.

The input device 103 inputs various instructions from a user. As the input device 103, use can be made of a keyboard, a mouse, various switches, a touch pad, a touch-panel display, and the like. An output signal from the input device 103 is supplied to the processing circuitry 101. Note that the input device 103 may be an input device of a computer connected to the processing circuitry 101 by wire or wirelessly.

The communication device 104 is an interface for executing data communication with an external device that is connected to the learning apparatus 1 via a network.

The display device 105 displays various data. As the display device 105, use can be made of, as appropriate, a CRT (Cathode-Ray Tube) display, a liquid crystal display, an organic EL (Electro Luminescence) display, an LED (Light-Emitting Diode) display, a plasma display, or a freely chosen display known in the present technical field. Besides, the display device 105 may be a projector.

Hereinafter, the details of the domain adaptation learning by the learning apparatus 1 are described. In the present embodiment, trained data is present for an existing domain, and the embodiment aims at enhancing the performance of object detection for the data of a new domain. However, an annotation cost for the data of the new domain needs to be reduced. Thus, the problem of unsupervised domain adaptation (UDA) for cross-domain object detection is dealt with. In a scenario of unsupervised domain adaptation, a complete annotation of a source domain data set is usable. In the scenario of unsupervised domain adaptation, the detection network is trained in a state in which the complete annotation is present for the data set of the source domain and an annotation is absent for the data set of the target domain. In addition, a method is introduced for giving a pseudo-label with high reliability to target data, thus making good use of the method for self-learning. A conventional UDA method has achieved a great improvement in performance in the target data set, while a UDA method involving self-learning aims at improving the precision of the detection network by further reducing a domain gap.

FIG. 4 is a flowchart of domain adaptation learning by the learning apparatus 1. The processing circuitry 101 starts the domain adaptation learning illustrated in FIG. 4, by reading and executing a learning program from the storage device 102. Note that it is assumed that, before starting step S201, a data set of target domain images, which is learning data, and a data set of source domain images, are prepared in the storage device 102 or in an external database or the like.

As illustrated in FIG. 4, the learning controller 117 inputs, to the detection network, learning data of a data number corresponding to one minibatch (S201). One minibatch is composed of a predetermined number of target domain images which are freely selected from the data set of target domain images prepared as the learning data. Note that there is a case where teaching labels are given to some of the target domain images prepared as the learning data, but in the present embodiment, it is assumed that no teaching label is given to the target domain images.

In the detection network 10 according to the first embodiment, as a base network layer (backbone), use is made of a CNN such as VGG (reference document 1 <Simonyan, Karen, and Andrew Zisserman. "Very deep convolutional networks for large-scale image recognition." arXiv preprint arXiv:1409.1556 (2014)>), or ResNet (reference document 2 <He, Kaiming, et al. "Deep residual learning for image recognition." Proceedings of the IEEE conference on computer vision and pattern recognition. 2016.>). In the estimation of a detection position and class name of an object, class classification and detection position regression of a target object are directly executed for each of pixels of a feature map, as in SSD (Single Shot Multibox Detector) that is one-stage type object detector (reference document 3 <Liu Wei, et al. "SSD: Single shot multibox detector." European conference on computer vision. Springer, Cham, 2016.>), or CenterNet (reference document 4 <Xingyi Zhou, Dequan Wang, Philipp Krahenbuhl. "Objects as Points.", arXiv 1904.07850 (2019)>). In addition, like Faster R-CNN (reference document 5 <Ren, Shaoqing, et al. "Faster r-cnn: Towards real-time object detection with region proposal networks." Advances in neural information processing systems. 2015.>), use may be made of a two-stage type object detector that executes class classification and detection position regression of a target object after extracting an object candidate region.

Hereinafter, as an example, it is assumed that an SSD is the base of the detection network according to the first embodiment. The SSD is a one-stage type object detector that is designed to detect a specific object in real time.

FIG. 5 is a diagram illustrating a network configuration example of an SSD-type detection network N50 used in the domain adaptation learning illustrated in FIG. 4. The detection network N50 includes a network configuration for inputting a target domain image and outputting a class name and a detection position of a specific object from the target domain image.

As illustrated in FIG. 5, the detection network N50 includes a base network layer N51, an auxiliary network layer N52, an NMS module N53, a class specifying module N54, and a detection position regression module N55. The base network layer N51 includes a feature extraction layer (convolution layer) that generates a feature map representing image features of an input image. As the base network layer N51, for example, use is made of a network layer with a VGG16 or the like as a base. In the base network layer N51, a fully connected layer of the VGG16 is replaced with a plurality of convolution layers. The auxiliary network layer N52 has a chain structure of multiple feature extraction layers (convolution layers) that extract feature maps of a plurality of scales. Objects of various sizes can be detected by the auxiliary network layer N52.

In each feature map, target points are set at regular intervals by a plurality of scales called "anchors". A plurality of reference rectangles (default boxes) with different sizes and aspect ratios for anchors are set on a class-by-class basis. In the SSD, 8732 reference rectangles are set for each class. In regard to each feature map, a class feature and a position feature are extracted for each reference rectangle.

The NMS module N53 executes non-maximum suppression (NMS) on a feature map that is output from the base network layer N51 and a feature map that is output from the auxiliary network layer N52, and suppresses a rectangle with low reliability in order to exclude the detection of a plurality of rectangles in regard to one anchor. The NMS module N53 outputs a class feature and a position feature for each rectangle. In the present embodiment, as illustrated in FIG. 5, it is assumed that the NMS module N53 is a network module included in the detection network N50.

The class specifying module N54 outputs a classification probability value for each class, based on the output from the NMS module N53, and outputs a class name corresponding to a higher classification probability value than a threshold. In the present embodiment, as illustrated in FIG. 5, it is assumed that the class specifying module N54 is a network module included in the detection network N50.

The detection position regression module N55 outputs a detection position for each class, based on the output from the NMS module N53. The detection position is defined by parameters such as coordinates of a reference point of a rectangle, a vertical width and a horizontal width. In the present embodiment, as illustrated in FIG. 5, it is assumed that the detection position regression module N55 is a network module included in the detection network N50.

As described above, the detection network N50 was described as including the base network layer N51, auxiliary network layer N52, NMS module N53, class specifying module N54 and detection position regression module N55. However, the present embodiment is not limited to this, and the NMS module N53, class specifying module N54 and detection position regression module N55 may be program modules that are independent from the detection network N50. Specifically, it is assumed that the minimum configuration of the detection network N50 is the base network layer N51 and auxiliary network layer N52.

If step S201 is executed, the detection task loss calculator 111 computes a detection task loss, and the domain identification loss calculator 112 computes a domain identification loss (S202).

To begin with, the computation of the detection task loss by the detection task loss calculator 111 is described. The detection task loss calculator 111 computes a detection task loss relating to a detection position and class identification, based on a target domain image with a pseudo label. A detection task loss $L_{SSD}$ is expressed by equation (1) below. A positive example means an image region in which an object of a detection target is rendered, and a negative example means an image region in which the object of the detection target is not rendered.

$$\mathcal{L}_{SSD} = -\sum_{i \in Pos} \log(P_i(\hat{c}_i | x^t)) - \sum_{i \in Neg} \log(P_i(0 | x^t)) + L_{loss}(x^t, \hat{b}) \quad (1)$$

Pos: set of positive examples
Neg: set of negative examples
$\hat{b}$: pseudo-bounding box label
$\hat{c}_i$: pseudo-class label
$P_i(\hat{c}_i/x^t)$: probability value of class C for i-th sample
$P_i(0|x^t)$: probability value of background to i-th sample
$L_{loss}$: loss to position specifying error
The above equation (1) defines the set Pos of positive examples and the set Neg of negative examples by using probability values $P(\cdot)$ for respective classes and backgrounds. $L_{loss}$ represents a loss to a specifying error of a position.

Next, the computation of the domain identification loss by the domain identification loss calculator 112 is described. The domain identification loss calculator 112 computes the domain identification loss relating to identification of the target domain and the source domain, by adversarial learning of the detection network based on the target domain image and the source domain image.

FIG. 6 is a diagram illustrating a network configuration example of a detection network for a domain identification loss. As illustrated in FIG. 6, for the adversarial learning, an identification network N61 is connected to the base network layer N51 of the detection network via gradient reversal layers (GRLs).

As described above, the base network layer N51 is a network layer that extracts image features included in the input image. The base network layer N51 generally includes a first local feature extraction layer N511, a second local feature extraction layer N512, and a global feature extraction layer N513. The first local feature extraction layer N511, for example, corresponds to conv3_2 of the base network layer N51. The first local feature extraction layer N511 extracts a local feature F1 that is a local feature of an input image. The second local feature extraction layer N512, for example, corresponds to conv3_3 of the base network layer N51. The second local feature extraction layer N512 extracts a local feature F2 that is a local feature of the input image. The local feature F2 represents a feature that is, although local, a feature of a larger area than the local feature F1. The global feature extraction layer N513 corresponds to conv4_3 of the base network layer N51, that is, a first detection head. The global feature extraction layer N513 extracts a global feature F3 that is a global feature of the input image.

As illustrated in FIG. 6, the identification network N61 includes a convolution layer N611, a convolution layer N612 and a domain identification layer N613. The convolution layer N611 is connected to the first local feature extraction layer N511 via a gradient reversal layer N621. The local feature F1 is supplied to the convolution layer N611 via the gradient reversal layer N621. The convolution layer N611 executes a convolution arithmetic operation on the local feature F1, and generates a domain prediction map. The convolution layer N612 is connected to the second local feature extraction layer N512 via a gradient reversal layer N622. The local feature F2 is supplied to the convolution layer N612 via the gradient reversal layer N622. The convolution layer N612 executes a convolution arithmetic operation on the local feature F2, and generates a domain prediction map. The domain identification layer N613 is connected to the global feature extraction layer N513 via a gradient reversal layer N623. The global feature F3 is supplied to the domain identification layer N613 via the gradient reversal layer N623. The domain identification layer N613 computes a domain identification value, based on the global feature F3.

The domain identification loss calculator 112 inputs a target domain image or a source domain image to the detection network N51, outputs a domain prediction map from each of the convolution layers N611 and N612, outputs a domain identification value from the domain identification layer N613, and computes a domain identification loss, based on a first domain identification loss relating to the domain prediction maps that are output from the convolution layers N611 and N612 and a second domain identification loss relating to the domain identification value that is output from the domain identification layer N613.

Hereinafter, the domain identification loss is described in greater detail. In the present model, for the feature alignment of a global level, the image features of the target image are made to agree with the source domain image by using the identification network N61. A target image that is easy to identify is located far from a source domain image in a feature space, and a target image that is difficult to identify is located near the source domain image. If hard alignment is forcibly applied to a global image feature, there may occur a greater shift that affects the layout of a scene (for example, the number of objects, and co-occurrence thereof), and thus there is a possibility that the performance of the model deteriorates. Accordingly, weak alignment is applied to the global feature. For this purpose, the identification network N61 needs to concentrate on the image that is difficult to identify, while not excessively concentrating on the image that is easy to identify. This is achieved by using an FL (Focal Loss) function indicated in equation (2) below, which is described in reference document 6 <T.-Y. Lin, P. Goyal, R. Girshick, K. He, and P. Doll'ar. Focal loss for dense object detection. In ICCV, 2017.>. Here, γ controls a weight on the image that is difficult to identify, and f(p$_t$) is a modulation factor of a cross entropy loss.

$$FL(p_t) = -f(p_t)\log(p_t)$$

$$f(p_t) = (1 - p_t)^\gamma \qquad (2)$$

In order to uniformize domain distributions, the model needs to minimize the domain identification loss, and at the same time, needs to optimize the parameters of the base network layer N51 by maximizing this loss. This can be achieved by using the gradient reversal layers N621, N622 and N623, while an ordinary gradient descent is applied to the learning of the identification network N61. When passing through the gradient reversal layers N621, N622 and N623, the sign of the gradient is reversed and the base network layer N51 is optimized.

Although the weak alignment on the global feature is suitable to the case where the domain shift is large, strong alignment on a local feature matches with the texture and color of the domain, and it is expected that the performance improves. A loss L$_{Dg}$ relating to the global domain identification is computed by a loss function indicated by equation (3) below. The loss L$_{Dg}$ is computed for each of a set S of source domain images and a set T of target domain images, in regard to an output D$_g$ of the domain identification layer N613.

$$L_{Dg}(F3, D_g) = -\frac{1}{N}\sum_{x_i \in (S,T)}\left(1 - D'_g(F3(x_i))\right)^\gamma \log\left(D'_g(F3(x_i))\right) \qquad (3)$$

$$D'_g(F3(x_i)) = \begin{cases} D_g(F3(x_i)) & \text{if } x_i \in S \\ 1 - D_g(F3(x_i)) & \text{if } x_i \in T \end{cases}$$

L$_{Dg}$: loss function relating to global domain identification
x$_i$: sample (image)
D$_g$: output (domain identification value) of domain identification layer
S: set of source domain images
T: set of target domain images As illustrated in FIG. 6, the network configuration of the convolution layer N611, N612 is designed by paying attention to local image features. The convolution layer N611, N612 is a fully convolutional layer with a kernel size of 1. The convolution layer N611, N612 outputs a domain prediction map having the same width and height as the input feature. A loss function of a loss L$_{Dl}$ relating to local domain identification is defined as indicated in equation (4) below. In equation (4), the loss L$_{Dl}$ outputs a feature having a width W and a height H. The convolution layer N611, N612 is trained based on a loss by a least squared error.

$$L_{Dl}(F, D_l) = \qquad (4)$$

-continued $$\frac{1}{2}\left(\frac{1}{n_s HW}\sum_{x \in S}\sum_H\sum_W (D_l(F(x^s)))^2 + \frac{1}{n_t HW}\sum_{x \in T}\sum_H\sum_W (1 - D_l(F(x^t)))^2\right)$$

L$_{Dl}$: loss function relating to local domain identification
F: feature
D$_l$: output (domain prediction map) of convolution layer N611, N612
S: set of source domain images
T: set of target domain images
H: height of input feature
W: width of input feature A loss function of a loss L$_{adv}$(F, D) for a domain adaptation loss is defined as indicated in equation (5) below, by using the loss L$_{Dl}$(F1, D$_1$) indicated in equation (4), which is based on the feature F1 and the domain prediction map D$_l$ based thereon; a loss L$_{Dl}$(F2, D$_l$) based on the feature F2 and the domain prediction map D$_l$ based thereon; and the loss L$_{Dg}$(F3, D$_g$) indicated in equation (3), which is based on the feature F3 and the domain identification value D$_g$ based thereon. The loss L$_{adv}$(F, D) may be defined by weighted addition of the L$_{Dl}$(F1, D$_l$), loss L$_{Dl}$(F2, D$_l$) and L$_{Dg}$(F3, D$_g$).

$$L_{adv}(F,D) = L_{Dl}(F1,D_l) + L_{Dl}(F2,D_l) + L_{Dg}(F3,D_g) \qquad (5)$$

In order to reduce the domain gap, the alignment of image features needs to be executed not only in the image level (scale of the image, style of the image, illumination, and the like), but also in regard to the local scale (features of texture, shape, color, and the like of the object). However, as described in non-patent literature 1, that the global image feature is forcibly invariable deteriorates the performance. As described above, in the present embodiment, in order to adapt to the domain shift of the image level, weak global feature alignment is applied. Conversely, the strong alignment of the local feature is useful for the model to achieve better invariance for such a feature, and there is a possibility that the domain gap is reduced. Such adjustment between a strong feature and a weak feature is achieved by adopting identification networks in various stages of the detection network, and adversarially training them.

If step S202 is executed, the learning controller 117 determines whether the current stage is a stage of executing self-learning (S203). As an example, it is assumed that whether to execute self-learning is correlated with the respective stages by a LUT (Look Up Table) or the like. A stage of executing self-learning and a stage of not executing self-learning may be experimentally or empirically determined in advance. In this case, the learning controller 117 may collate the current stage with the LUT, and may determine whether the current stage is a stage of executing self-learning.

If it is determined that the current stage is the stage of executing self-learning (S203: YES), the self-learning loss calculator 113 computes a self-learning loss (S204). As described above, as the self-learning losses, there are an integrated pseudo-label self-learning loss that is computed by the first self-learning loss calculator 118, and a manifold synthesis self-learning loss that is computed by the second self-learning loss calculator 119. In the present embodiment, it is assumed that both the integrated pseudo-label self-learning loss and the manifold synthesis self-learning loss are computed. In the self-learning, the pseudo-label is used. If the quality of the pseudo-label is good, a better detection network can be generated. Thus, the pseudo-label generator 116 generates the integrated pseudo-label in order to compute the integrated pseudo-label self-learning loss, and generates the manifold synthesis pseudo-label in order to compute the manifold synthesis self-learning loss.

The computation of the integrated pseudo-label self-learning loss by the first self-learning loss calculator 118 is described. In the computation of the integrated pseudo-label self-learning loss, to begin with, the pseudo-label generator 116 generates the integrated pseudo-label. The pseudo-label generator 116 generates a plurality of post-conversion images by applying a plurality of kinds of image conversions to the target domain image, computes a plurality of prediction labels by applying the post-conversion images to the detection network, and generates the integrated pseudo-label, based on an ensemble of the prediction labels.

FIG. 7 is a diagram illustrating a generation process of the integrated pseudo-label. As illustrated in FIG. 7, the pseudo-label generator 116 first generates a plurality of post-conversion images by applying a plurality of kinds of image conversions to the target domain image (S301). The image conversion is similar to that used in data augmentation. Specifically, in the image conversions, simple conversions, such as a slide or color value reversal of an image, enlargement, reduction or the like, may be executed. In FIG. 7, it is assumed that N kinds of image conversion are executed. Thereby, N post-conversion images TIn (n is a subscript to a post-conversion image; $2 \leq n \leq N$).

If step S301 is executed, the pseudo-label generator 116 applies an identical position detector N70 to the N post-conversion images TIn, and generates prediction labels Boxn ($2 \leq n \leq N$) (S302). The prediction label Boxn corresponds to a detection position that is output from the detection network, or, in other words, a bounding box. The detection network at the current stage may be used for the position detector N70.

If step S302 is executed, the pseudo-label generator 116 generates a single detection label (hereinafter referred to as "integrated detection label") by ensembling the N prediction labels Boxn (S303). The ensembling corresponds to computing an average value of the detection labels obtained at the same position.

If step S303 is executed, the pseudo-label generator 116 filters the integrated detection labels (S304). By the filtering, an integrated detection label with low reliability is eliminated, and an integrated detection label with high reliability is extracted. The extracted integrated detection label is used as the integrated pseud-label.

FIG. 8 is a view illustrating a pseud-code of an algorithm of the filtering in step S304. As illustrated in FIG. 8, O, O*, s and δ are input. As indicated in row 1, a freely selected region (rectangle) $r_i^*$ is read from the set O* of rectangles after execution of NMS of each Boxn, and, as indicated in row 2, a freely selected region (rectangle) $r_i$ is read from the set O of all prediction results that are output from Boxn. As indicated in row 3, $IoU(r_i^*, r_i)$ that is an IoU value between the region $r_i^*$ and region $r_i$ is computed, and $IoU(r_i^*, r_i)$ is compared with threshold δ. As indicated in row 4, if $IoU(r_i^*, r_i)$ is threshold δ or more, $r_i$ is collected from O. The process of row 2 to row 6 is repeated while the region $r_i$ is changed. If the process of row 2 to row 6 is repeated for all regions $r_i$ belonging to O, SRRS is computed according to equation (6) below, as indicated in row 7. As indicated in row 8, SRRS is compared with threshold ε. If SRRS is threshold ε or more, a region $r_i^*$ is added to a set Y of pseudo-labels. If SRRS is less than threshold ε, the region $r_i^*$ is discarded. As indicated in row 11, the process of row 1 to row 11 is executed for all regions $r_i^*$ belonging to the set O*. If the process is executed for all regions $r_i^*$, a set Y is output. The region $r_i^*$ belonging to the set Y means the integrated pseudo-label.

$$SRRS(r^*) = \frac{1}{N_s} \sum_{i=1}^{N_s} IoU(r_i, r_i^*) \cdot P(c^* | r_i) \tag{6}$$

$N_s$: number of regions supported
IoU(A, B): IoU value of regions of A and B
$P(c^*/r_i)$: probability that region $r_i$ belongs to c
c*: predicted class
$r_i$: region FIG. 9 is a view illustrating a prediction result of a detection position for one image. FIG. 10 is a view illustrating superimposition of prediction results of a plurality of detection positions for a plurality of images. FIG. 11 is a view illustrating an integrated pseudo-label. As illustrated in FIG. 9, all prediction labels are accumulated on the scale of the original image. As illustrated in FIG. 10, if a certain object is detected in many post-conversion images, it is expected that a plurality of bounding boxes are present around the object. Thereby, the reliability of detection is enhanced. Thus, a bounding box (integrated detection label) is computed by averaging the bounding boxes around the object. This process corresponds to the ensemble. If all bounding boxes are detected, the algorithm illustrated in FIG. 8 is applied, a bounding box with low reliability is discarded, and a final bounding box (integrated pseudo-label) is obtained. FIG. 11 illustrates the final bounding box (integrated pseudo-label). By applying the algorithm illustrated in FIG. 8, it is guaranteed that the integrated pseudo-label has high reliability. The integrated pseudo-label is useful as a pseudo-label with high reliability in weak self-learning. The weak self-learning is useful in learning category information of a detection object, in order to train a more excellent domain invariable model in a semi-supervised learning environment.

If the integrated pseudo label is generated, the first self-learning loss calculator 118 computes the integrated pseudo-label self-learning loss, based on the target domain image with the integrated pseudo-label.

A best result is obtained with a model that is trained by a data set with a large-scale annotation. On the other hand, in the domain adaptation scenario, the target data set is not annotated. If there is an annotation of a target data set, it is expected that the annotation is useful for the model to learn a basic data distribution. Thus, to generate a correct label is indispensable in order to improve the performance of the model. In many cases, since the label generated for target data from a model trained by only source data has a large domain shift, an erroneous output is produced even if the reliability score is high. If the pseudo-labels are generated, these are treated as positive examples at the time of learning. Negative examples (Neg) for learning are generally obtained by hard negative mining. However, if a false negative is selected by the hard negative mining, there arises a problem with the learning. In the present embodiment, in order to ignore a negative example that may possibly become a foreground, $\|Neg^-\|/3$ samples with a least reliability loss among negative examples are selected. This process is called "weak negative mining", and $Neg^-$ can be obtained. Equation (7) expresses a loss function of an integrated pseudo-label self-learning loss $L_{wst}$. In the loss function $L_{wst}$, compared with the loss function (equation 1) of the detection task loss, the position specifying loss is ignored.

$$L_{wst}=-\Sigma_{i \in Pos} \log(P_i(c_i|x^t))-\Sigma i \in \widetilde{Neg} \log(P_i(0|x^t)) \qquad (7)$$

After the unsupervised domain adaptation learning is stabilized, the pseudo-label is generated by applying weak self-learning. When the pseudo-label is not correct, there is a possibility that the self-learning adversely affects the parameters of the model, and thus the weak self-learning is applied to only several stages.

Next, the computation of the manifold synthesis self-learning loss by the second self-learning loss calculator 119 is described. The manifold synthesis self-learning loss is used in order to improve the precision of self-learning using the pseudo-label.

Reference document 7 <H. Zhang, M. Cisse, Y. N. Dauphin, and D. Lopez-Paz, "mixup: Beyond Empirical Risk Minimization," in arXiv:1710.09412, 2017> discloses a data augmentation method of creating a new learning sample by mixing a pair of two learning samples, which is called "Mixup". On the other hand, non-patent literature 3 proposes a manifold mixup method in which a feature in a hidden layer is subjected to linear interpolation and a corresponding label is subjected to linear connection, and these are used for learning. This method functions as a regularization method, provides robustness to an adversarial sample and a damaged label, and improves the generalization performance of a deep neural network. An additional input signal is provided by linear interpolation of the hidden layer, and a class expression is made flat, leading to generation of a more smooth decision boundary.

FIG. 12 is a diagram illustrating a computation process of a manifold synthesis self-learning loss $L_{mixup}$. As illustrated in FIG. 12, the pseudo-label generator 116 obtains a j-th target domain image $I^j$ and a k-th target domain image $I^k$. It is assumed that the target domain image $I^j$ and the target domain image $I^k$ are included in an identical minibatch. The pseudo-label generator 116 extracts a feature $F_\theta(I^j)$ by applying a feature extraction process $F_\theta$ to the target domain image $I^j$, and extracts a feature $F_\theta(I^k)$ by applying the feature extraction process $F_e$ to the target domain image $I^k$ (S401). The feature extraction process $F_\theta$ may be executed by applying the target domain image $I^j$ and the target domain image $I^k$ to the feature extraction layer included in the base network layer N51 or auxiliary network layer N52 included in the detection network at the current stage.

If step S401 is executed, the pseudo-label generator 116 mixes the feature $F_\theta(I^j)$ and the feature $F_\theta(I^k)$, and computes a synthesis feature (S402). The synthesis feature is computed according to equation (8) below. Equation (8) expresses that linear connection is executed for two vectors of a and b by $\lambda$ that is sampled from a beta distribution. In step S402, for example, $F_\theta(I^j)$ is substituted for the vector a, and $F_\theta(I^k)$ is substituted for the vector b, thereby obtaining a synthesis feature $MIX(F_\theta(I^j), F_\theta(I^k))$.

$$MIX_\lambda(a,b)=\lambda \cdot a+(1-\lambda) \cdot b \qquad (8)$$

$\lambda$: mixing count, which is obtained by sampling from beta distribution $\beta(\alpha,\alpha)$ $\alpha$: hyperparameter If step S402 is executed, the pseudo-label generator 116 generates a manifold synthesis pseudo-label $y^m_t$ by applying a position detection process to the synthesis feature MIX $(F_\theta(I^j), F_\theta(I^k))$ (S403). The position detection process may be executed by forwardly propagating the synthesis feature $MIX(F_\theta(I^j), F_\theta(I^k))$ to the detection network at the current stage.

On the other hand, the pseudo-label generator 116 generates a manifold synthesis pseudo-label $y^m_{t-1}$ by mixing a pseudo-label $y_\theta^j$ for a j-th image and a pseudo-label $y_\theta^k$ for a k-th image, which were generated from the detection network in an immediately preceding stage (S404). The manifold synthesis pseudo-label $y^m_{t-1}$ can be computed according to the above equation (8). For example, the manifold synthesis pseudo-label $y^m_{t-1}$ can be obtained by computing $MIX(y_\theta^j, y_\theta^k)$ by substituting $y_\theta^j$ for the vector a and substituting $y_\theta^k$ for the vector b.

If steps S403 and S404 are executed, the second self-learning loss calculator 119 computes a manifold synthesis self-learning loss $L_{mixup}$, based on the manifold synthesis pseudo-label $y^m_t$ and the manifold synthesis pseudo-label $y^m_{t-1}$ (S405). The manifold synthesis self-learning loss $L_{mixup}$ is computed according to equation (9) below. Here, $x^m$ represents a mixed feature, and $y^m$ represents a corresponding mixed class label. As regards the model parameters, intermediate features F1, F2 and F3 are used. As $L_{mixup}$, use is made of a total of binary cross entropy losses computed for the set of positive examples and the set of negative examples.

$$\Sigma i \in \widetilde{Neg}_{MIXUP}=-\Sigma_{Pos}BCELoss(\hat{y}_m,y^m)-\Sigma$$
$$\Sigma \widetilde{Neg} \; BCELoss(\hat{y}_m|x^m),y^m) \qquad (9)$$

$$x^m=(1-\lambda)F_\theta(x_j)+\lambda F_\theta(x_k)$$

$$y^m=(1-\lambda)y_j+\lambda y_k$$

$\hat{y}^m$: predicted class probability for $x^m$ $x_j$: j-th target image $y_j$: label corresponding to j-th target image $x_k$: k-th target image $y_k$: label corresponding to k-th target image $\lambda$: mixing count, which is obtained by sampling from beta distribution $\beta(\alpha, \alpha)$ $\alpha$: hyperparameter If step S204 is executed or if it is determined that the current stage is not the stage of executing self-learning (S203: NO), the total loss calculator 114 computes a total loss by weighted addition of a detection task loss $L_{SSD}$, a domain identification loss $L_{adv}$, and a self-learning loss (S205). Specifically, the total loss calculator 114 first computes a loss $L_{det}$ according to equation (10) below. In a case where the current stage is the self-learning stage, the loss $L_{det}$ is computed by addition of the detection task loss $L_{SSD}$, the integrated pseudo-label self-learning loss $L_{wst}$, and the manifold synthesis self-learning loss $L_{mixup}$. In a case where the current stage is a stage other than the self-learning stage, the loss $L_{det}$ agrees with the detection task loss $L_{SSD}$.

$$L_{det} = \begin{cases} \mathcal{L}_{SSD} + \mathcal{L}_{wst} + \mathcal{L}_{MIXUP} & \text{Self} - \text{learning stage} \\ \mathcal{L}_{SSD} & \text{Others} \end{cases} \qquad (10)$$

Upon computing the loss $L_{det}$, the total loss calculator 114 computes, according to equation (11) below, a total loss $L_{TOTAL}$, based on the weighted addition of the loss $L_{det}$ and the domain identification loss $L_{adv}$. The weighting factor A can be set at a freely chosen value.

$$L_{TOTAL}=L_{adv}-\lambda L_{det}(F,D) \qquad (11)$$

If step S205 is executed, the update unit 115 updates the learning parameters of the detection network, based on the total loss $L_{TOTAL}$ (S206). Specifically, the update unit 115 updates, as defined in mathematical expression (12) below, the learning parameters by optimizing an objective function based on the total loss. To be more specific, the learning parameters are updated by maximizing the domain identification loss $L_{adv}$, while minimizing the loss $L_{det}$. Thereby, the total loss is minimized. As the optimization method, use may be made of a freely selected method such as stochastic gradient descent (SGD) or ADAM.

$$\max_{D} \min_{det} L_{det} - \lambda L_{adv}(F, D) \qquad (12)$$

If step S206 is executed, the learning controller 117 determines whether a training end condition is met (S207). The training end condition is set to be, for example, that a predetermined total repetition number is reached. If it is determined that the training end condition is not met (S207: NO), the learning controller 117 inputs a new minibatch of learning data to the detection network. Then, steps S202 to S207 are executed for the new minibatch. In this manner, until it is determined that the training end condition is met, steps S201 to S207 are repeated while the minibatch is changed.

Then, if it is determined that the training end condition is met (S207: YES), the learning controller 117 ends the domain adaptation learning.

Note that the flow of the domain adaptation learning illustrated in FIG. 4 is merely an example, and the present embodiment is not limited to this. Hereinafter, various modifications and applied examples are described.

As described above, the detection task loss calculator 111 may compute the detection task loss, based on the target domain image with a teaching label. In this case, the detection task loss can be computed by using, instead of the pseudo-label, the teaching label that is given to the target domain image.

It was described that the loss $L_{det}$ in the self-learning stage according to the above-described embodiment is computed by the weighted addition of the detection task loss $L_{SSD}$, the integrated pseudo-label self-learning loss $L_{wst}$, and the manifold synthesis self-learning loss $L_{mixup}$. However, in the domain adaptation that does not use the source domain image, as indicated in equation (13) below, the loss $L_{det}$ in the self-learning stage may be computed by the weighted addition of the detection task loss $L_{SSD}$ and the manifold synthesis self-learning loss $L_{mixup}$, without using the integrated pseudo-label self-learning loss $L_{wst}$.

$$L_{det} = \begin{cases} \mathcal{L}_{SSD} + \mathcal{L}_{MIXUP} & \text{Self} - \text{learning stage} \\ \mathcal{L}_{SSD} & \text{Others} \end{cases} \qquad (13)$$

In addition, the loss $L_{det}$ in the self-learning stage can be variously modified according to whether or not to utilize the source domain image, or in accordance with the network configuration or the like of the detection network. For example, the loss $L_{det}$ may be computed based on only the integrated pseudo-label self-learning loss $L_{wst}$, or may be computed by the weighted addition of the detection task loss $L_{SSD}$ and the integrated pseudo-label self-learning loss $L_{wst}$.

In the above-described embodiment, the detection task loss calculator 111 is described as computing the detection task loss, based on only the target domain image. However, the detection task loss may be computed by using not only the target domain image but also the source domain image with the teaching label. Thereby, the source domain image can be effectively utilized, and the performance of the detection network can be improved.

As described above, the learning apparatus 1 according to the first embodiment includes the learning unit 110 that generates the detection network for detecting an object from the image belonging to the target domain. The learning unit 110 includes the detection task loss calculator 111, domain identification loss calculator 112, self-learning loss calculator 113, total loss calculator 114, and update unit 115. The detection task loss calculator 111 computes a detection task loss by supervised learning of a detection network, which is based on a target domain image, the detection task loss being a loss relating to a detection position and class identification. The domain identification loss calculator 112 computes a domain identification loss by adversarial learning of the detection network, which is based on the target domain image and the source domain image, the domain identification loss being a loss relating to identification of the target domain and the source domain. The self-learning loss calculator 113 computes a self-learning loss by self-learning of the detection network, which is based on the target domain image, the self-learning loss being a loss relating to class identification by self-learning. The total loss calculator 114 computes a total loss, based on weighted addition of a domain identification loss, a detection task loss and/or a self-learning loss. The update unit 115 updates the learning parameters of the detection network by minimizing the total loss.

According to the configuration of the first embodiment, in the domain adaptation learning, the learning parameters of the detection network are updated by minimizing the total loss that is based on the weighted addition of the domain identification loss, the detection task loss and/or the self-learning loss. By taking the domain identification loss into account, it becomes possible to make closer the feature expressions of the source domain and the target domain by adversarial training. In addition, in the stage of executing self-learning, the self-learning loss can be taken into account, and in the stage of not executing self-learning, the detection task can be taken into account without the self-learning loss being taken into account. Thereby, it becomes possible to improve the learning performance of the domain adaptation learning to the target domain with no or few teaching labels, and it becomes possible to improve the performance of the object detection by utilizing the trained detection network that is generated by the domain adaptation learning. By taking into account the integrated pseudo-label self-learning loss as the self-learning loss, the self-learning is executed by using the pseudo-label (integrated pseudo-label) with high reliability that is generated by the ensemble method, and therefore the precision of self-learning can be enhanced. By taking into account the manifold synthesis self-learning loss as the self-learning loss, the self-learning is executed by using the pseudo-label (manifold synthesis pseudo-label) with high reliability that is generated by the manifold mixup method, and therefore the precision of self-learning can be enhanced.

Second Embodiment

A second embodiment relates to an object detection apparatus, an object detection method and an object detection program.

FIG. 13 is a diagram illustrating a configuration example of an object detection apparatus 2 according to the second embodiment. The object detection apparatus 2 is a computer that detects a specific object by utilizing a trained detection network that is generated by the learning apparatus 1 according to the first embodiment. The object detection apparatus 2 is used, for example, in person detection in regard to an image captured by a security camera, or in vehicle detection in regard to an image captured by an in-vehicle camera.

As illustrated in FIG. 13, the object detection apparatus 2 is a computer including processing circuitry 201, a storage device 202, an input device 203, a communication device 204 and a display device 205. Data communication between the processing circuitry 201, storage device 202, input device 203, communication device 204 and display device 205 is executed via a bus.

The processing circuitry 201 includes a processor such as a CPU, and a memory such as a RAM. The processing circuitry 201 includes an obtainment unit 210, a processing unit 220 and an output unit 230. The processing circuitry 201 implements the functions of the respective units 210 to 230 by executing an object detection program relating to object detection according to the present embodiment. The object detection program is stored in a non-transitory computer-readable storage medium such as the storage device 202. The object detection program may be implemented as a single program that describes all functions of the units 210 to 230, or may be implemented as a plurality of modules divided into some functional units. Besides, the units 210 to 230 may be implemented by integrated circuits such as an ASIC. In this case, the units 210 to 230 may be implemented in a single integrated circuit, or may be individually implemented in a plurality of integrated circuits.

The obtainment unit 210 obtains various kinds of data. For example, the obtainment unit 210 obtains a processing-target image of object detection. The obtainment unit 210 may obtain the various data from an external apparatus via the communication device 204, or may obtain the various data from the storage device 202.

The processing unit 220 outputs a detection position and class name of an object included in the processing-target image, based on the processing-target image and the trained detection network generated by the learning apparatus 1 according to the first embodiment.

The output unit 230 outputs various data. For example, the output unit 230 causes the display device 205 to display the detection position and class name of the object included in the processing-target image, which are output by the processing unit 220.

The storage device 202 is composed of a ROM, an HDD, an SSD, an integrated circuit storage device, or the like. The storage device 202 stores various data such as a detection network, a processing-target image, and an object detection program.

The input device 203 inputs various instructions from a user. As the input device 203, use can be made of a keyboard, a mouse, various switches, a touch pad, a touch-panel display, and the like. An output signal from the input device 203 is supplied to the processing circuitry 201. Note that the input device 203 may be an input device of a computer connected to the processing circuitry 201 by wire or wirelessly.

The communication device 204 is an interface for executing data communication with an external device that is connected to the object detection apparatus 2 via a network.

The display device 205 displays various data. As the display device 205, use can be made of, as appropriate, a CRT display, a liquid crystal display, an organic EL display, an LED display, a plasma display, or a freely chosen display known in the present technical field. Besides, the display device 205 may be a projector.

Hereinafter, the details of the object detection by the object detection apparatus 2 are described.

FIG. 14 is a flowchart of the object detection by the object detection apparatus 2. The processing circuitry 201 starts the object detection illustrated in FIG. 14, by reading the object detection program from the storage device 202 and executing the object detection program. It is assumed that the detection network is stored in advance in the storage device 202 or the like. The detection network may be any object detector that is domain-adapted to the target domain, but, like the first embodiment, the detection network is a one-stage type SSD.

As illustrated in FIG. 14, the obtainment unit 210 obtains a processing-target image (S501). The processing-target image is an image belonging to a domain that has become a new adaptation destination by domain adaptation, that is, the target domain.

If step S501 is executed, the processing unit 220 forms the processing-target image in an input size of the detection network (S502).

If step S502 is executed, the processing unit 220 applies the processing-target image after the formation to the detection network, thereby predicting the class name and detection position (S503). Specifically, to begin with, the processing unit 220 forwardly propagates the processing-target image after the formation to the base network layer N51 and auxiliary network layer N52 illustrated in FIG. 5, and generates a feature map for each class. Next, the processing unit 220 executes the NMS module N53, applies non-maximum suppression on the feature map of each class, eliminates overlapping rectangles, and outputs the class feature and position feature for each class in regard to each rectangle. Then, the processing unit 220 executes the class specifying module N54, outputs a classification probability value for each class from the class feature, and outputs a class name of a class having a classification probability value exceeding a set threshold. In addition, the processing unit 220 executes the detection position regression module N55, outputs a detection position for each class from the position feature, and outputs a detection position of a class having a classification probability value exceeding a set threshold.

If step S503 is executed, the output unit 230 outputs the class name and the detection position (S504). For example, a processing-target image, on which text representative of the class name and a rectangle representative of the detection position are superimposed, is displayed on the display device 205.

According to the second embodiment, the object detection can be executed by using the trained detection network that is generated according to the first embodiment. Therefore, object detection with high performance can be executed.

Third Embodiment

A third embodiment relates to a learning support system, a learning support method and a learning support program. FIG. 15 is a diagram illustrating a configuration example of a learning support system 3 according to the third embodiment. The learning support system 3 is a computer network system that supports learning of a trained deep learning network. The deep learning network according to the third embodiment is not limited to the detection network according to the first and second embodiments, and may be a network that executes any kind of task. However, in order to give a concrete description below, it is assumed that the deep learning network according to the third is the detection network according to the first and second embodiments.

The learning support system 3 provides to the user the information that enables visual recognition of the correspondence relation between learning data and recognition performance, for example, when domain-adapting the learning data by using data obtained at an installation place of a camera for person detection in regard to an image captured by a security camera, or in vehicle detection in regard to an image captured by an in-vehicle camera, or when aiming at improving the recognition performance by using learning data captured at various places.

As illustrated in FIG. 15, the learning support system 3 includes a learning apparatus 1, an object detection apparatus 2, an existing domain data storage device 4, a new domain data storage device 5, a history storage device 6 and an evaluation apparatus 7. The learning apparatus 1, object detection apparatus 2, existing domain data storage device 4, new domain data storage device 5, history storage device 6 and evaluation apparatus 7 are connected in such a manner as to be capable of communicating data with each other via a communication network such as a LAN.

The existing domain data storage device 4 is a storage device that stores a data set of existing domain data with teaching labels. The existing domain data is image data having teaching labels, such as positions and class names, of objects that may become detection objects.

The new domain data storage device 5 is a storage device that stores a data set of new domain data without teaching labels. The new domain data is image data having no teaching labels such as positions and class names of objects, the image data being newly collected in different situations, places and the like.

The learning apparatus 1 includes functions similar to the functions of the learning apparatus 1 according to the first embodiment. The learning apparatus 1 trains a plurality of detection networks, based on a plurality of learning statuses with various learning data and learning condition parameters. To be more specific, as regards the existing domain data, the learning apparatus 1 trains the detection network relating to the existing domain, by supervised learning based on the existing domain data. In addition, as regards the new domain data, the learning apparatus 1 trains the detection network relating to the new domain, by domain adaptation learning based on the new domain data and the existing domain data.

The object detection apparatus 2 mounts therein a plurality of detection networks trained by the learning apparatus 1. By an instruction from the evaluation apparatus 7, the object detection apparatus 2 applies data for evaluation to a plurality of detection networks, and predicts a plurality of class names and detection positions. The class names and detection positions predicted based on the data for evaluation are referred to as "evaluation result". The data for evaluation may be the existing domain data, new domain data, or other image data.

The history storage device 6 is a storage device that stores history information. The history storage device 6 correlates and stores, as the history information, a plurality of networks executing a predetermined task and a plurality of learning statuses, the networks being trained in the learning statuses in which learning data and/or learning parameters are different. Specifically, the history storage device 6 correlates and stores a plurality of detection networks trained by the learning apparatus 1, and a plurality of pieces of learning status information corresponding to the respective detection networks. In addition, the history storage device 6 may correlate and store, as the history information, a plurality of detection networks and a plurality of evaluation results corresponding to the respective detection networks.

The evaluation apparatus 7 is a computer that generates a plurality of evaluation results by applying the data for evaluation to a plurality of detection networks by utilizing the object detection apparatus 2, and causes a display device to display the evaluation results and the learning statuses in an arranged manner.

As illustrated in FIG. 15, the evaluation apparatus 7 is a computer including processing circuitry 701, a storage device 702, an input device 703, a communication device 704 and a display device 705. Data communication between the processing circuitry 701, storage device 702, input device 703, communication device 704 and display device 705 is executed via a bus.

The processing circuitry 701 includes a processor such as a CPU, and a memory such as a RAM. The processing circuitry 701 includes an obtainment unit 710, an evaluation unit 720, a selection unit 730 and an output unit 740. The processing circuitry 701 implements the functions of the respective units 710 to 740 by executing a learning support program relating to learning support according to the present embodiment. The learning support program is stored in a non-transitory computer-readable storage medium such as the storage device 702. The learning support program may be implemented as a single program that describes all functions of the units 710 to 740, or may be implemented as a plurality of modules divided into some functional units. Besides, the units 710 to 740 may be implemented by integrated circuits such as an ASIC. In this case, the units 710 to 740 may be implemented in a single integrated circuit, or may be individually implemented in a plurality of integrated circuits.

The obtainment unit 710 obtains various kinds of data. For example, the obtainment unit 710 obtains data for evaluation, and evaluation results from the object detection apparatus 2.

The evaluation unit 720 generates a plurality of evaluation results by applying the data for evaluation to a plurality of detection networks by utilizing the object detection apparatus 2.

The selection unit 730 selects, from a plurality of learning statuses, a learning status that is useful for training the detection network, based on the evaluation results.

The output unit 740 outputs various data. For example, the output unit 740 causes the display device 705 to display the evaluation results that are output by the evaluation unit 720. In addition, the output unit 740 causes the display device 705 to display the learning status selected by the selection unit 730.

The storage device 702 is composed of a ROM, an HDD, an SSD, an integrated circuit storage device, or the like. The storage device 702 stores various data such as a detection network, and a learning support program.

The input device 703 inputs various instructions from the user. As the input device 703, use can be made of a keyboard, a mouse, various switches, a touch pad, a touch-panel display, and the like. An output signal from the input device 703 is supplied to the processing circuitry 701. Note that the input device 703 may be an input device of a computer connected to the processing circuitry 701 by wire or wirelessly.

The communication device 704 is an interface for executing data communication with external devices such as the learning apparatus 1, object detection apparatus 2, existing domain data storage device 4, new domain data storage device 5 and history storage device 6, which are connected to the evaluation apparatus 7 via a network.

The display device 705 displays various data. As the display device 705, use can be made of, as appropriate, a CRT display, a liquid crystal display, an organic EL display, an LED display, a plasma display, or a freely chosen display known in the present technical field. Besides, the display device 705 may be a projector.

Hereinafter, the details of the learning support by the learning support system 3 are described.

FIG. 16 is a flowchart of learning support by the learning support system 3. As illustrated in FIG. 16, the learning apparatus 1 trains the detection network, based on the existing domain data and learning condition (S601).

If step S601 is executed, the learning apparatus 1 trains the detection network, based on the new domain data (S602). In step S602, like the first embodiment, the learning apparatus 1 trains, by domain adaptation learning, the detection network trained in regard to the existing domain.

If step S602 is executed, the history storage device 6 stores the learning status (the existing domain data and learning condition) used in step S601 and the detection network trained in accordance with the learning status, and stores the learning status used in step S602 and the detection network trained in accordance with the learning status (the new domain data and learning condition) (S603).

If step S603 is executed, the evaluation unit 720 of the evaluation apparatus 7 generates an evaluation result by applying the data for evaluation to the detection network (S604). As the data for evaluation, use is made of an image (hereinafter "test image") freely selected from the new domain data or the existing domain data. Step S604 is described in detail. To begin with, the evaluation apparatus 7 transmits the test image, together with a generation instruction of an evaluation result, to the object detection apparatus 2. The object detection apparatus 2 applies the test image to each of trained detection networks, and outputs, as an evaluation result, the class name and detection position of a specific object included in the test image. The object detection apparatus 2 transmits the test image to the evaluation apparatus 7 and the history storage device 6. The history storage device 6 stores the evaluation result by correlating the evaluation result with each of the detection networks.

If step S604 is executed, the output unit 740 of the evaluation apparatus 7 causes the display device 705 to display the evaluation result and the learning status (S605).

FIG. 17 is a diagram illustrating an example of a display screen 113 of an evaluation result and a learning status. As illustrated in FIG. 17, a display screen 113 displays three test images I131, I132 and I133. In each of the test images I131, I132 and I133, a class name, such as "A", "B" or "C", and a detection position represented by a detection rectangle, are superimposed and displayed as an evaluation result. The class name and the detection position correspond to the evaluation result. In regard to each evaluation result, identification information of learning data, such as "D1", "D2" or "D3", and a learning condition parameter, such as "P1", "P2" or "P3", are displayed in an arranged manner. The learning data and the learning condition parameter correspond to a learning condition.

As illustrated in FIG. 17, by displaying the evaluation result and the learning status in a visually associated manner, it becomes possible to evaluate the performance of the detection network. For example, in FIG. 17, it is assumed that the class "B" is an over-detection that does not actually present in the test image. This case means that the performance of the detection network, which is used for the test image I131 in which the object of the class name "B" is over-detected, is not good, and the performances of the detection networks, which are used for the test images I132 and I133 in which the object of the class name "B" is not over-detected, are good. Accordingly, it is understood that the learning data D2 and learning condition parameter P2, which are used in training the detection network applied to the test image I132, or the learning data D3 and learning condition parameter P3, which are used in training the detection network applied to the test image I133, are useful in training the detection network for the domain to which the test image belongs.

Note that the display example illustrated in FIG. 17 is merely an example, and is not limited to this. Hereinafter, other display examples are described. In general, as regards learning condition parameters, there are a plurality of kinds of parameters. Thus, it is preferable that only learning condition parameters with different values are displayed. Thereby, it becomes possible to easily recognize learning condition parameters that contribute to the difference between evaluation results.

If step S605 is executed, the evaluation apparatus 7 determines whether or not to execute learning by other new domain data (S606). For example, whether or not to execute further learning may be determined in accordance with an instruction by the user through the input device 703. Alternatively, whether or not to execute further learning may be determined according to whether the learning of new domain data of all preset learning targets has been executed. If it is determined that the learning by other new domain data is executed (S606: YES), steps S602 to S605 is repeated.

Then, if it is determined that the learning by other new domain data is not executed (3606: NO), the learning support by the learning support system 3 ends.

Next, a selection process of a learning status by the selection unit 730 is described. Based on a plurality of evaluation results, the selection unit 730 selects a learning status that is useful in training the detection network, from among a plurality of learning statuses. Hereinafter, the process by the selection unit 730 is concretely described.

FIG. 18 is a view illustrating an example of a display screen 118 of nine evaluation results. FIG. 19 is a view illustrating an aggregate result 19 of the nine evaluation results illustrated in FIG. 18. FIG. 20 is a Venn diagram 20 representing the aggregate result of FIG. 19. The display screen 118 is displayed, for example, in step 3605 of FIG. 16. Like FIG. 17, each test image displays, as an evaluation result, class names and detection positions in a superimposed manner. The nine evaluation results are obtained by applying nine detection networks to an identical test image.

As illustrated in FIG. 18 and FIG. 19, the class "A" is detected by seven detection networks, the class "B" is detected by two detection networks, and the class "C" is detected by nine detection networks. It is assumed that the objects of the class "A" and class "C" are present in the test image, and the object of the class "B" is absent in the test image and is thus the over-detection. An oval of each class included in the Venn diagram 20 represents a set of learning statuses used in the training of the detection networks that detected this class. For example, the set of learning statuses used in the training of the detection networks that correctly detected the class "A" is represented by the oval of the class "A".

The selection unit 730 computes a difference set between a product set of the sets of learning statuses used in the training of the detection networks that correctly detected the specific object, and the set of learning statuses used in the training of the detection networks that conducted the over-detection. In the example of FIG. 20, the selection unit 730 computes the product set of the set of learning statuses used in the training of the detection networks that correctly detected the class "A" and the set of learning statuses used in the training of the detection networks that correctly detected the class "C", and computes a difference set 21 by subtracting, from the product set, the set of learning statuses used in the training of the detection networks that correctly detected the class "C". Then, the selection unit 730 selects the learning statuses belonging to the difference set 21 as the learning statuses that are useful in the training of the detection networks. It is expected that a detection network with less over-detection is generated by training the detection network by using the learning data and learning condition parameters included in the selected learning statuses.

At this time, with respect to each detection rectangle, information as to whether the target object is correctly detected is necessary. If existing teaching data is present, this determination is possible. However, if teaching data is absent, teaching by manual operation is necessary. For example, an input interface may be added to the display device 705, and teaching information may be given by an operation such as by interactively clicking a rectangle as regards which of detection rectangles is a correct target object.

FIG. 21 is a view illustrating a comparison result of performance of domain adaptation learning. A data set of PASCAL VOC was used as the source domain, and a Clipart data set was used as the target domain. As an index of performance, mAP (mean Average Precision) was used. The mAP is a value obtained by averaging, over all classes, AP (mean Average Precision) values representing areas under a Precision-Recall curve of each class. The mAP represents the performance of class identification with respect to a target domain image.

Part (A) of FIG. 21 indicates a result of an SSD trained by only the source domain. Part (B) indicates a result of an SSD trained by only the target domain with a teaching label. Parts (C1), (C2) and (C3) indicate results of conventional methods of non-patent literature 1 and non-patent literature 2. Parts (P1), (P2), (P3) and (P4) indicate results of the method of the present application. Part (P1) indicates a result in a case of only a domain identification loss by the domain identification loss calculator 112. Part (P2) indicates a result in a case where the integrated pseudo-label self-learning loss by the first self-learning loss calculator 118 is added to the comparative method (C2). Part (P3) indicates a result in a case where the domain identification loss by the domain identification loss calculator 112 is combined, and part (P4) indicates a result in a case where the manifold synthesis self-learning loss by the second self-learning loss calculator 119 is further added. As illustrated in FIG. 21, in each of the methods of the present application, the performance is improved compared to the conventional methods. Note that in FIG. 21, a white circle indicates the implementation of the comparative method, and a black circle indicates the implementation of the method of the present application. As regards P2 and P3 in FIG. 21, the combination of functions is the same. However, as regards Global•Local, P2 is the implementation of the comparative method, and P3 is the implementation of the method of the present application. If P2 and P3 are compared, it is understood that P3 is better than P2 with respect to the mAP.

The above-described embodiment is merely an example, and the third embodiment is not limited to this. For example, the detection network may be mounted in the evaluation apparatus 7. Alternatively, the obtainment unit 710, evaluation unit 720, selection unit 730 and output unit 740 may be mounted in the object detection apparatus 2.

As described above, the deep learning network of the evaluation target is not limited to the detection network, and the third embodiment can adapt to deep learning networks that execute any kind of task, such as image generation, speech recognition or abnormality detection. In accordance with this, the contents, data formats, and the like of the new domain data and the existing domain data may be changed.

As described above, the learning support system 3 according to the third embodiment includes the history storage device 6 and the evaluation apparatus 7. The history storage device 6 correlates and stores a plurality of networks and a plurality of learning statuses, the networks executing a predetermined task and being trained in a plurality of learning statuses in which learning data and/or learning conditions are mutually different. The evaluation apparatus 7 applies the data for evaluation to the networks, generates evaluation results, and causes the display device 705 to display the evaluation results and the learning statuses in an arranged manner.

According to the above-described configuration, in the case where there are a plurality of networks of an identical task, which are trained in different learning statuses, it is possible to understand the learning status that is proper or improper to the construction of the network of the task, by comparing and examining the evaluation results and learning statuses obtained by applying the networks to the common data for evaluation. By extension, the performance of the network of the task can be improved, and the precision of the task can be enhanced.

Therefore, according to the above-described embodiments, it is possible to achieve the improvement of the performance of the object detection by the detection network obtained by domain adaptation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus comprising processor configured to generate a detection network for detecting an object from an image belonging to a target domain, the processor being configured to:

compute a detection task loss that is a loss relating to a detection position and class identification, by supervised learning of the detection network, the supervised learning being based on the image belonging to the target domain;

compute a domain identification loss by adversarial learning of the detection network, the adversarial learning being based on the image belonging to the target domain and an image belonging to a source domain, and the domain identification loss being a loss relating to identification of the target domain and the source domain;

compute a self-learning loss by self-learning of the detection network, the self-learning being based on the image belonging to the target domain, and the self-learning loss being a loss relating to class identification by the self-learning;

compute a total loss, based on weighted addition of the domain identification loss, the detection task loss and/or the self-learning loss;

update learning parameters of the detection network by minimizing the total loss;

compute, as the self-learning loss, a first self-learning loss relating to class identification by self-learning utilizing an integrated pseudo-label based on the image belonging to the target domain; and compute, as the self-learning loss, a second self-learning loss relating to class identification by self-learning utilizing a manifold synthesis pseudo-label based on the image belonging to the target domain; and use, as the self-learning loss, the first self-learning loss and/or the second self-learning loss; and compute, in each of plural iteration stages, a first intermediate output and a second intermediate output by applying a first image and a second image, which belong to the target domain, to the detection network, and compute the manifold synthesis pseudo-label, based on linear connection between the first intermediate output and the second intermediate output; and compute the second self-learning loss in a current iteration stage, based on the manifold synthesis pseudo-label in the current iteration stage and the manifold synthesis pseudo-label in a past iteration stage.

2. The learning apparatus of claim 1, wherein the processor is configured to:

determine whether the current iteration stage is an iteration stage for executing the self-learning; and compute the self-learning loss if the current iteration stage is determined to be the iteration stage for executing the self-learning.

3. The learning apparatus of claim 1, wherein the processor is configured to:

generate a plurality of post-conversion images by applying a plurality of kinds of image conversions to the image belonging to the target domain;

compute a plurality of detection labels by applying the post-conversion images to the detection network;

generate the integrated pseudo-label, based on an ensemble of the detection labels; and compute the first self-learning loss, based on the image belonging to the target domain with the integrated pseudo-label.

4. The learning apparatus of claim 2, wherein processor is configured to:

compute the total loss, based on the weighted addition of the domain identification loss and the detection task loss, if the current iteration stage is determined to be not the iteration stage for executing the self-learning; and compute the total loss, based on the weighted addition of the domain identification loss, the detection task loss and/or the self-learning loss, if the current iteration stage is determined to be the iteration stage for executing the self-learning.

5. The learning apparatus of claim 1, wherein an identification network for identifying a domain, to which an input image belongs, is connected to the detection network via a gradient reversal layer that reverses a sign of a gradient, and the processor computes the domain identification loss, based on an output from the identification network.

6. The learning apparatus of claim 5, wherein the detection network includes a local feature extraction layer that outputs a feature vector representative of a local image feature, and a global feature extraction layer that outputs a feature vector representative of a global image feature, the identification network includes a convolution layer connected to the local feature extraction layer via a first gradient reversal layer, and a domain identification layer connected to the global feature extraction layer via a second gradient reversal layer, and the processor computes the domain identification loss, based on a first domain identification loss relating to a domain prediction map that is output from the convolution layer, and a second domain identification loss relating to a domain identification value that is output from the domain identification layer.

7. The learning apparatus of claim 1, wherein the processor computes the detection task loss, based on the image belonging to the target domain with a teaching label or a pseudo-label.

8. The learning apparatus of claim 1, wherein the detection network is a one-stage type object detector.

9. The learning apparatus of claim 1, wherein the detection network is a deep learning network trained based on the image belonging to the source domain.

10. A learning support system comprising:

a storage device configured to correlate and store a plurality of networks executing a predetermined task and a plurality of learning statuses, the networks being trained in the learning statuses in which learning data and/or learning conditions are mutually different; and a processor configured to:

generate a plurality of evaluation results by applying data for evaluation to the networks, and configured to cause a display device to display the evaluation results and the learning statuses in an arranged manner, generate a detection network for detecting an object from an image belonging to a target domain, compute a detection task loss that is a loss relating to a detection position and class identification, by supervised learning of the detection network, the supervised learning being based on the image belonging to the target domain, compute a domain identification loss by adversarial learning of the detection network, the adversarial learning being based on the image belonging to the target domain and an image belonging to a source domain, and the domain identification loss being a loss relating to identification of the target domain and the source domain, compute a self-learning loss by self-learning of the detection network, the self-learning being based on the image belonging to the target domain, and the self-learning loss being a loss relating to class identification by the self-learning, compute a total loss, based on weighted addition of the domain identification loss, the detection task loss and/or the self-learning loss, compute, as the self-learning loss, a first self-learning loss relating to class identification by self-learning utilizing an integrated pseudo-label based on the image belonging to the target domain, compute, as the self-learning loss, a second self-learning loss relating to class identification by self-learning utilizing a manifold synthesis pseudo-label based on the image belonging to the target domain, and use, as the self-learning loss, the first self-learning loss and/or the second self-learning loss; and compute, in each of plural iteration stages, a first intermediate output and a second intermediate output by applying a first image and a second image, which belong to the target domain, to the detection network, and compute the manifold synthesis pseudo-label, based on linear connection between the first intermediate output and the second intermediate output; and compute the second self-learning loss in a current iteration stage, based on the manifold synthesis pseudo-label in the current iteration stage and the manifold synthesis pseudo-label in a past iteration stage.

11. The learning support system of claim 10, wherein each of the networks is a detection network that detects an object from an image, and each of the evaluation results is an image in which a rectangle representative of a detection position of the object is rendered.

12. The learning support system of claim 10, wherein the processor selects, from the learning statuses, a learning status that is useful for training the network that executes the predetermined task, based on the evaluation results.

13. The learning support system of claim 12, wherein the networks are a plurality of detection networks each detecting an object from an image, and the processor is configured to:

display, as the evaluation results, a plurality of evaluation images in each of which a rectangle representative of a detection position of the object is rendered;

specify, from the evaluation images, an evaluation image that correctly detects the object;

specify, from the detection networks, a detection network used in generation of the specified evaluation image; and select, as the useful learning status, a learning status correlated with the specified detection network, from among the learning statuses.

14. The learning support system of claim 10, further comprising:

a learning data storage device that stores a plurality of learning data among the learning statuses; and a learning apparatus configured to train the networks, based on the learning statuses, wherein the history storage device stores the learning statuses as results of the networks by the learning apparatus.

15. A learning method comprising a learning step of generating a detection network for detecting an object from an image belonging to a target domain, the learning step including:

computing a detection task loss that is a loss relating to a detection position and class identification, by supervised learning of the detection network, the supervised learning being based on the image belonging to the target domain;

computing a domain identification loss by adversarial learning of the detection network, the adversarial learning being based on the image belonging to the target domain and an image belonging to a source domain, and the domain identification loss being a loss relating to identification of the target domain and the source domain;

computing a self-learning loss by self-learning of the detection network, the self-learning being based on the image belonging to the target domain, and the self-learning loss being a loss relating to class identification by the self-learning;

computing a total loss, based on weighted addition of the domain identification loss, the detection task loss and/or the self-learning loss;

updating learning parameters of the detection network by minimizing the total loss; including, computing, as the self-learning loss, a first self-learning loss relating to class identification by self-learning utilizing an integrated pseudo-label based on the image belonging to the target domain; and computing, as the self-learning loss, a second self-learning loss relating to class identification by self-learning utilizing a manifold synthesis pseudo-label based on the image belonging to the target domain; and using, as the self-learning loss, the first self-learning loss and/or the second self-learning loss; and computing, in each of plural iteration stages, a first intermediate output and a second intermediate output by applying a first image and a second image, which belong to the target domain, to the detection network, and compute the manifold synthesis pseudo-label, based on linear connection between the first intermediate output and the second intermediate output; and computing the second self-learning loss in a current iteration stage, based on the manifold synthesis pseudo-label in the current iteration stage and the manifold synthesis pseudo-label in a past iteration stage.

16. A learning support method comprising:

correlating and storing, in a storage device, a plurality of networks executing a predetermined task and a plurality of learning statuses, the networks being trained in the learning statuses in which learning data and/or learning conditions are mutually different; and generating a plurality of evaluation results by applying data for evaluation to the networks, and causing a display device to display the evaluation results and the learning statuses in an arranged manner, including computing a detection task loss that is a loss relating to a detection position and class identification, by supervised learning of the detection network, the supervised learning being based on the image belonging to the target domain, computing a domain identification loss by adversarial learning of the detection network, the adversarial learning being based on the image belonging to the target domain and an image belonging to a source domain, and the domain identification loss being a loss relating to identification of the target domain and the source domain, computing a self-learning loss by self-learning of the detection network, the self-learning being based on the image belonging to the target domain, and the self-learning loss being a loss relating to class identification by the self-learning, computing a total loss, based on weighted addition of the domain identification loss, the detection task loss and/or the self-learning loss, computing, as the self-learning loss, a first self-learning loss relating to class identification by self-learning utilizing an integrated pseudo-label based on the image belonging to the target domain, computing, as the self-learning loss, a second self-learning loss relating to class identification by self-learning utilizing a manifold synthesis pseudo-label based on the image belonging to the target domain, and using, as the self-learning loss, the first self-learning loss and/or the second self-learning loss; and computing, in each of plural iteration stages, a first intermediate output and a second intermediate output by applying a first image and a second image, which belong to the target domain, to the detection network, and compute the manifold synthesis pseudo-label, based on linear connection between the first intermediate output and the second intermediate output; and computing the second self-learning loss in a current iteration stage, based on the manifold synthesis pseudo-label in the current iteration stage and the manifold synthesis pseudo-label in a past iteration stage.

* * * * *